United States Patent
Ellmauthaler et al.

(10) Patent No.: US 11,326,936 B2
(45) Date of Patent: May 10, 2022

(54) TOPSIDE DISTRIBUTED ACOUSTIC SENSING INTERROGATION OF SUBSEA WELLS WITH A SINGLE OPTICAL WAVEGUIDE

(71) Applicant: Halliburton Energy Services, Inc., Houston, TX (US)

(72) Inventors: Andreas Ellmauthaler, Houston, TX (US); Glenn Andrew Wilson, Houston, TX (US); John L. Maida, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 17 days.

(21) Appl. No.: 16/806,930

(22) Filed: Mar. 2, 2020

(65) Prior Publication Data

US 2021/0270667 A1   Sep. 2, 2021

(51) Int. Cl.
| | |
|---|---|
| *G01H 9/00* | (2006.01) |
| *E21B 47/135* | (2012.01) |
| *G01V 1/38* | (2006.01) |
| *G01V 1/52* | (2006.01) |
| *G02B 6/02* | (2006.01) |
| *H04J 14/02* | (2006.01) |

(52) U.S. Cl.
CPC ........... *G01H 9/004* (2013.01); *E21B 47/135* (2020.05); *G01V 1/38* (2013.01); *G01V 1/52* (2013.01); *G02B 6/02076* (2013.01); *H04J 14/02* (2013.01)

(58) Field of Classification Search
None
See application file for complete search history.

(56) References Cited

U.S. PATENT DOCUMENTS

| | | | |
|---|---|---|---|
| 5,903,350 A | 5/1999 | Bush et al. | |
| 6,556,509 B1 | 4/2003 | Cekorich et al. | |
| 6,778,820 B2 | 8/2004 | Tendler | |
| 6,933,491 B2 * | 8/2005 | Maida, Jr. | H04B 10/2589 250/227.14 |
| 6,995,899 B2 * | 2/2006 | Aronstam | G01D 5/353 359/333 |
| 8,557,345 B2 | 10/2013 | Qi et al. | |

(Continued)

FOREIGN PATENT DOCUMENTS

| | | |
|---|---|---|
| JP | 2001-057538 | 2/2001 |
| WO | 2004-102242 | 11/2004 |
| WO | 2018084871 | 5/2018 |

OTHER PUBLICATIONS

U.S. Appl. No. 16/586,091 dated Sep. 27, 2019.

(Continued)

*Primary Examiner* — Curtis A Kuntz
*Assistant Examiner* — Jerold B Murphy
(74) *Attorney, Agent, or Firm* — John Wustenberg; C. Tumey Law Group PLLC

(57) ABSTRACT

A distributed acoustic system (DAS) may comprise an interrogator and an umbilical line attached at one end to the interrogator, a downhole fiber attached to the umbilical line at the end opposite the interrogator. The interrogator may further include a proximal circulator, a distal circulator connected to the proximal circulator by a first fiber optic cable, and a second fiber optic cable connecting the proximal circulator and the distal circulator.

20 Claims, 21 Drawing Sheets

(56) References Cited

U.S. PATENT DOCUMENTS

| | | | |
|---|---|---|---|
| 8,605,542 B2 | 12/2013 | Coates et al. | |
| 9,766,371 B2 | 9/2017 | Barfoot et al. | |
| 10,309,825 B2 | 6/2019 | Suh et al. | |
| 2005/0041971 A1* | 2/2005 | Lee | H04J 14/02 |
| | | | 398/72 |
| 2007/0047867 A1 | 3/2007 | Goldner | |
| 2013/0271769 A1 | 10/2013 | Handerek | |
| 2015/0085610 A1 | 3/2015 | Raum et al. | |
| 2016/0259083 A1* | 9/2016 | Barfoot | E21B 47/135 |
| 2017/0248480 A1* | 8/2017 | Dong | G01D 5/35316 |
| 2018/0066440 A1 | 3/2018 | Valero Vasseur | |
| 2020/0131900 A1* | 4/2020 | Leblanc | E21B 47/135 |

OTHER PUBLICATIONS

U.S. Appl. No. 62/848,999 dated May 16, 2019.
Silixa iDAS, Carina Subsea 4D, Constellation.
SLB Optical amplifier for long-reach DAS (U.S. Pat. No. 6,995,899 B2).
WPS FiberVSP.
PE/Pinnacle FiberWatch.
HCT Sand Face Instrumentation.
U.S. Appl. No. 16/587,607 dated Sep. 30, 2019.
International Search Report and Written Opinion for Application No. PCT/US2020/023967, dated Dec. 1, 2020.

\* cited by examiner

WITH: $t_{tot} = t_{s1} + t_{sep} + t_{s2}$

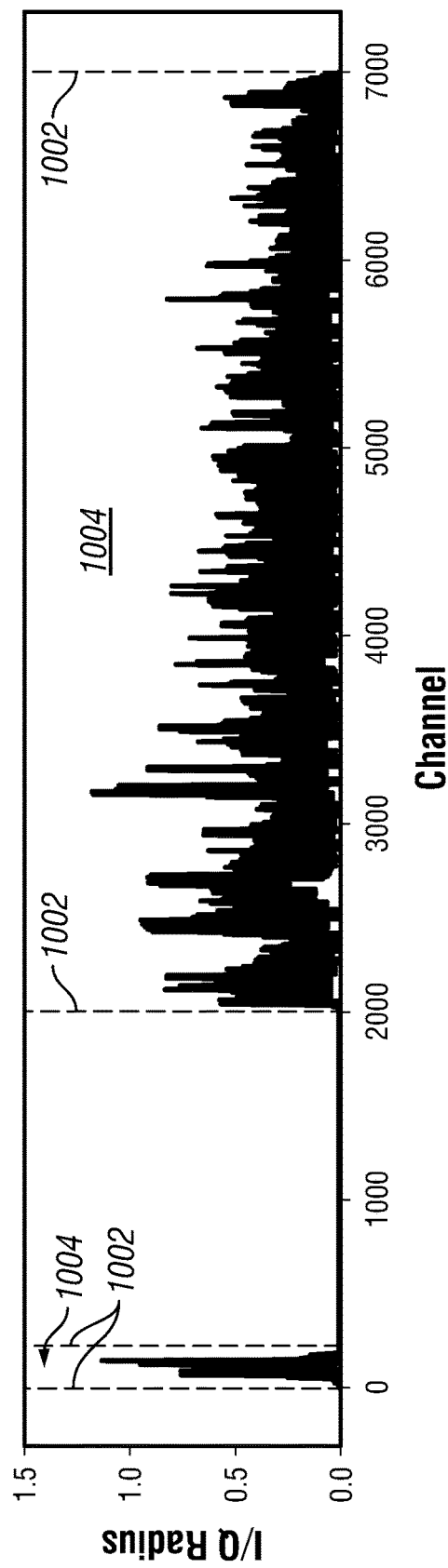
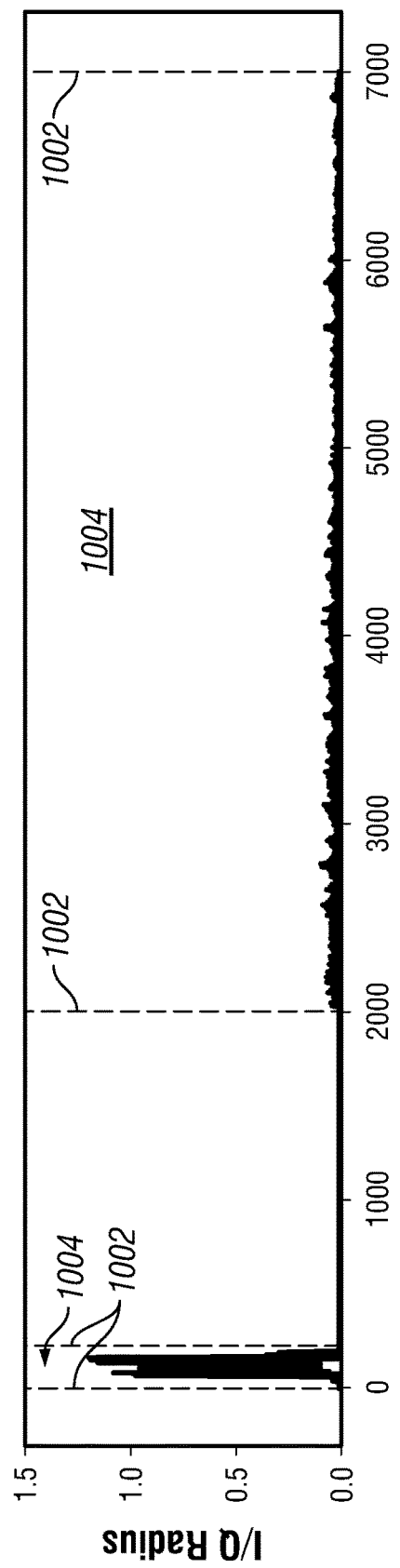
FIG. 10B
FIG. 10C

TOPSIDE DISTRIBUTED ACOUSTIC SENSING INTERROGATION OF SUBSEA WELLS WITH A SINGLE OPTICAL WAVEGUIDE

BACKGROUND

Boreholes drilled into subterranean formations may enable recovery of desirable fluids (e.g., hydrocarbons) using a number of different techniques. A number of systems and techniques may be employed in subterranean operations to determine borehole and/or formation properties. For example, Distributed Acoustic Sensing (DAS) along with a fiber optic system may be utilized together to determine borehole and/or formation properties. Distributed fiber optic sensing is a cost-effective method of obtaining real-tinge, high-resolution, highly accurate temperature and strain (acoustic) data along at least a portion of the wellbore. In examples, discrete sensors, e.g., for sensing pressure and temperature, may be deployed in conjunction with the fiber optic cable. Additionally, distributed fiber optic sensing may eliminate downhole electronic complexity by shifting all electro-optical complexity to the surface within the interrogator unit. Fiber optic cables may be permanently deployed in a wellbore via single- or dual-trip completion strings, behind casing, on tubing, or in pumped down installations; or temporally via coiled tubing, slickline, or disposable cables.

Distributed sensing can be enabled by continuously sensing along the length of the fiber, and effectively assigning discrete measurements to a position along the length of the fiber via optical time-domain reflectometry (OTDR). That is, knowing the velocity of light in fiber, and by measuring the time it takes the backscattered light to return to the detector inside the interrogator, it is possible to assign a distance along the fiber.

Distributed acoustic sensing has been practiced for dry tree wells, but has not been attempted in wet-tree (or subsea) wells, to enable interventionless, time-lapse reservoir monitoring via vertical seismic profiling (VSP), well integrity, flow assurance, and sand control. A subsea operation may utilize optical engineering solutions to compensate for losses accumulated through long (~5 to 100 km) lengths of subsea transmission fiber, 10 km of in-well subsurface fiber, and multiple wet- and dry-mate optical connectors, splices, and optical feedthrough systems (OFS).

BRIEF DESCRIPTION OF THE DRAWINGS

For a detailed description of the preferred examples of the disclosure, reference will now be made to the accompanying drawings in which:

FIG. 10B illustrates a graph with an active proximal circulator using an optimized DAS sampling frequency of 12.5 kHz;

FIG. 10C illustrates a graph with a passive proximal circulator using an optimized DAS sampling frequency of 12.5 kHz;

DETAILED DESCRIPTION

The present disclosure relates generally to a system and method for using fiber optics in a DAS system in a subsea operation. Subsea operations may present optical challenges which may relate to the quality of the overall signal in the DAS system with a longer fiber optical cable. The overall signal may be critical since the end of the fiber contains the interval of interest, i.e., the well and reservoir sections. To prevent a drop in signal-to-noise (SNR) and signal quality, the DAS system described below may increase the returned signal strength with given pulse power, decrease the noise floor of the receiving optics to detect weaker power pulses, maintain the pulse power as high as possible as it propagates down the fiber, increase the number of light pulses that can be launched into the fiber per second, and/or increase the maximum pulse power that can be used for given fiber length.

Figure 1:
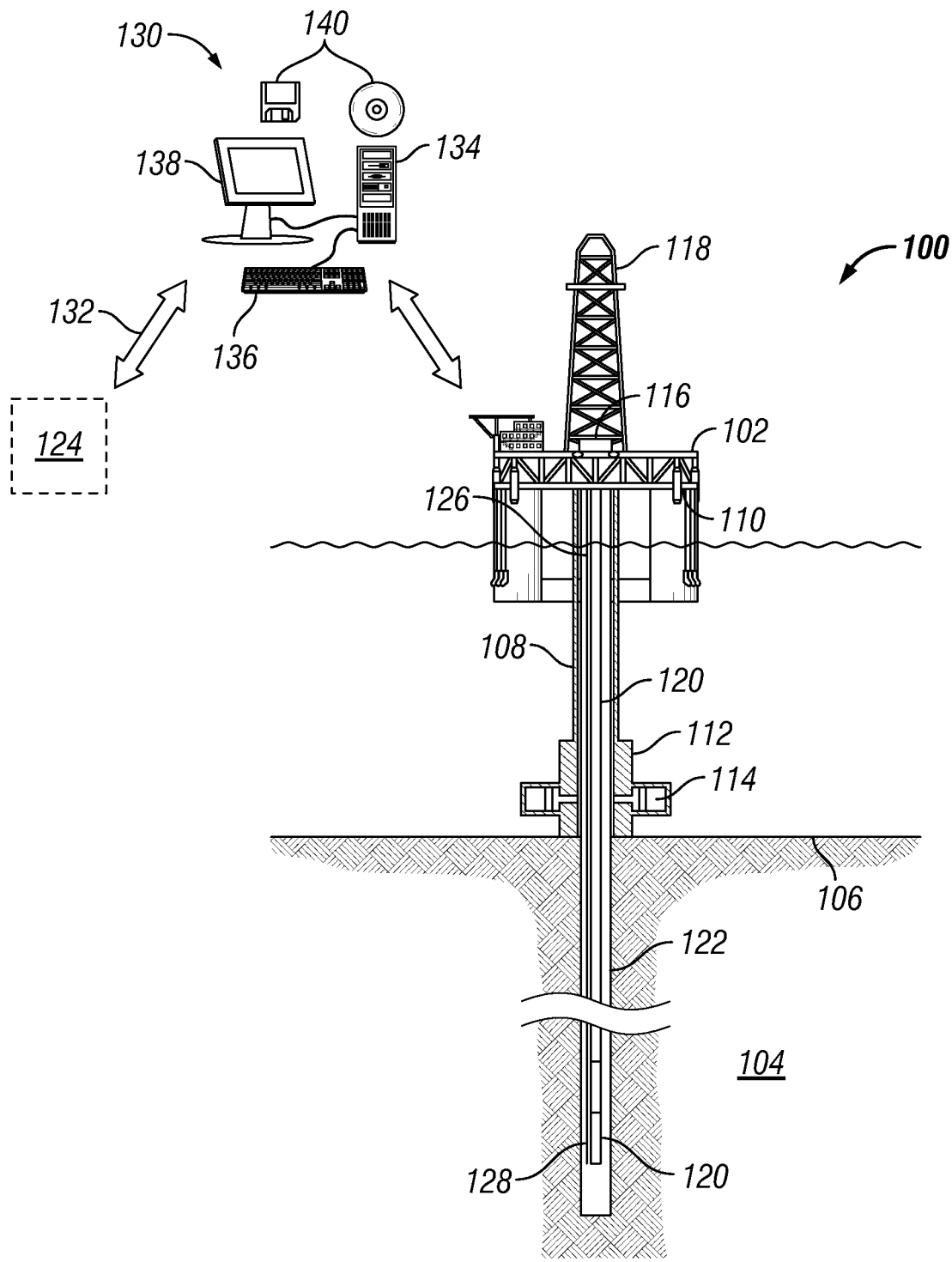
FIG. 1 illustrate an example of a well measurement system in a subsea environment.

FIG. 1 illustrates an example of a well system 100 that may employ the principles of the present disclosure. More particularly, well system 100 may include a floating vessel 102 centered over a subterranean hydrocarbon bearing formation 104 located below a sea floor 106. As illustrated, floating vessel 102 is depicted as an offshore, semi-submersible oil and gas drilling platform, but could alternatively include any other type of floating vessel such as, but not limited to, a drill ship, a pipe-laying ship, a tension-leg platforms (TLPs), a "spar" platform, a production platform, a floating production, storage, and offloading (FPSO) vessel, and/or the like. Additionally, the methods and systems described below may also be utilized on land-based drilling operations. A subsea conduit or riser 108 extends from a deck 110 of floating vessel 102 to a wellhead installation 112 that may include one or more blowout preventers 114. In examples, riser 108 may also be referred to as a flexible riser, flowline, umbilical, and/or the like. Floating vessel 102 has a hoisting apparatus 116 and a derrick 118 for raising and lowering tubular lengths of drill pipe, such as a tubular 120.

In examples, tubular 120 may be a drill string, casing, production pipe, and/or the like.

A wellbore 122 extends through the various earth strata toward the subterranean hydrocarbon bearing formation 104 and tubular 120 may be extended within wellbore 122. Even though FIG. 1 depicts a vertical wellbore 122, it should be understood by those skilled in the art that the methods and systems described are equally well suited for use in horizontal or deviated wellbores. During drilling operations, the distal end of tubular 120, for example a drill sting, may include a bottom hole assembly (BHA) that includes a drill bit and a downhole drilling motor, also referred to as a positive displacement motor ("PDM") or "mud motor." During production operations, tubular 120 may include a DAS system. The DAS system may be inclusive of an interrogator 124, umbilical line 126, and downhole fiber 128. Without any limitation any optical fiber utilized in interrogator 124, umbilical line 126, or downhole fiber 128 may be an ultra-low loss transmission fiber that has higher power handling capability before non-linearity. This is captured in the optical budget, but is also chosen to enable higher gain from co-propagating Raman amplification. An ultra-low loss transmission fiber does not include higher doping or embedded reflective features along the length of the ultra-low transmission, characteristics that may be found in current fiber optic cables. These characteristics increase light scattering within fiber optic cable. The more doping and embedded reflective features within the fiber optic cable, the larger a Rayleigh scattering coefficient of the fiber optic cable will be, and vice versa.

Figure 31:
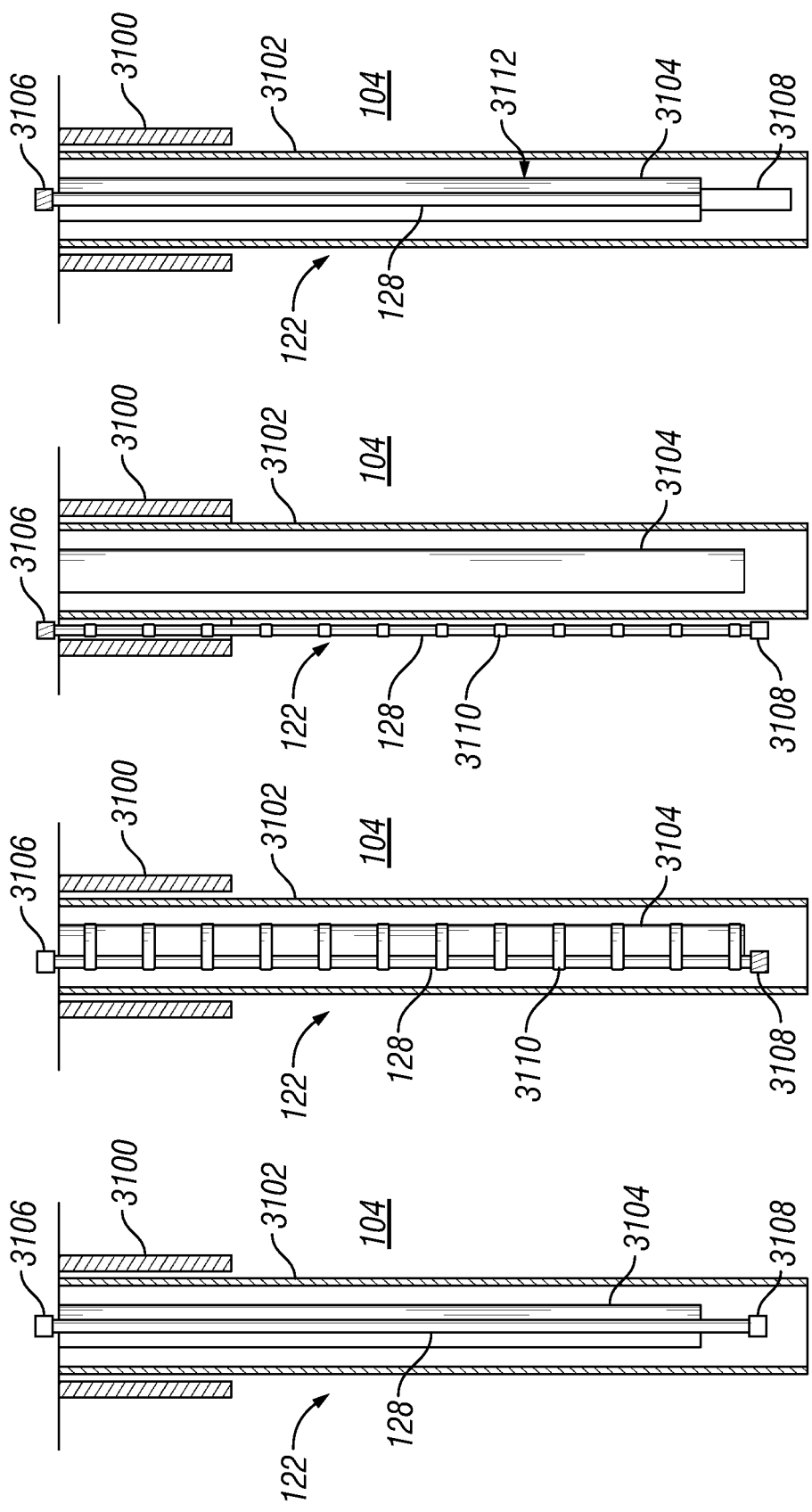
FIG. 31A-31D illustrates examples of a downhole fiber deployed in a wellbore.

Downhole fiber 128 may be permanently deployed in a wellbore via single- or dual-trip completion strings, behind casing, on tubing, or in pumped down installations. In examples, downhole fiber 128 may be temporarily deployed via coiled tubing, wireline, slickline, or disposable cables. FIGS. 31A-31D illustrate examples of different types of deployment of downhole fiber 128 in wellbore 122 (e.g., referring to FIG. 1). As illustrated in FIG. 31A, wellbore 122 deployed in formation 104 may include surface casing 3100 in which production casing 3102 may be deployed. Additionally, production tubing 3104 may be deployed within production casing 3102. In this example, downhole fiber 128 may be temporarily deployed in a wireline system in which a bottom hole gauge 3108 is connected to the distal end of downhole fiber 128. Further illustrated, downhole fiber 128 may be coupled to a fiber connection 3106. Without limitation, fiber connection 3106 may attach downhole fiber 128 to umbilical line 126 (e.g., referring to FIG. 1). Fiber connection 3106 may operate with an optical feedthrough system (itself comprising a series of wet- and dry-mate optical connectors) in the wellhead that optically couples downhole fiber 128 from the tubing hanger, to umbilical line 126 on the wellhead instrument panel. Umbilical line 126 may include an optical flying lead, optical distribution system(s), umbilical termination unit(s), and transmission fibers encapsulated in flying leads, flow lines, rigid risers, flexible risers, and/or one or more umbilical lines. This may allow for umbilical line 126 to connect and disconnect from downhole fiber 128 while preserving optical continuity between the umbilical line 126 and the downhole fiber 128.

FIG. 31B illustrates an example of permanent deployment of downhole fiber 128. As illustrated wellbore 122 deployed in formation 104 may include surface casing 3100 in which production casing 3102 may be deployed. Additionally, production tubing 3104 may be deployed within production casing 3102. In examples, downhole fiber 128 is attached to the outside of production tubing 3104 by one or more cross-coupling protectors 3110. Without limitation, cross-coupling protectors 3110 may be evenly spaced and may be disposed on every other joint of production tubing 3104. Further illustrated, downhole fiber 128 may be coupled to fiber connection 3106 at one end and bottom hole gauge 3108 at the opposite end.

FIG. 31C illustrates an example of permanent deployment of downhole fiber 128. As illustrated wellbore 122 deployed in formation 104 may include surface casing 3100 in which production casing 3102 may be deployed. Additionally, production tubing 3104 may be deployed within production casing 3102. In examples, downhole fiber 128 is attached to the outside of production casing 3102 by one or more cross-coupling protectors 3110. Without limitation, cross-coupling protectors 3110 may be evenly spaced and may be disposed on every other joint of production tubing 3104. Further illustrated, downhole fiber 128 may be coupled to fiber connection 3006 at one end and bottom hole gauge 3008 at the opposite end.

FIG. 31D illustrates an example of coiled tubing operation in which downhole fiber 128 may be deployed temporarily. As illustrated in FIG. 31D, wellbore 122 deployed in formation 104 may include surface casing 3100 in which production casing 3102 may be deployed. Additionally, coiled tubing 3112 may be deployed within production casing 3102. In this example, downhole fiber 128 may be temporarily deployed in a coiled tubing system in which a bottom hole gauge 3108 is connected to the distal end of downhole fiber. Further illustrated, downhole fiber 128 may be attached to coiled tubing 3112, which may move downhole fiber 128 through production casing 3102. Further illustrated, downhole fiber 128 may be coupled to fiber connection 3106 at one end and bottom hole gauge 3108 at the opposite end. During operations, downhole fiber 128 may be used to take measurements within wellbore 122, which may be transmitted to the surface and/or interrogator 124 (e.g., referring to FIG. 1) in the DAS system.

Additionally, within the DAS system, interrogator 124 may be connected to an information handling system 130 through connection 132, which may be wired and/or wireless. It should be noted that both information handling system 130 and interrogator 124 are disposed on floating vessel 102. Both systems and methods of the present disclosure may be implemented, at least in part, with information handling system 130. Information handling system 130 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 130 may be a processing unit 134, a network storage device, or any other suitable device and may vary in size, shape, performance, functionality, and price. Information handling system 130 may include random access memory (RAM), one or more processing resources such as a central processing unit (CPU) or hardware or software control logic, ROM, and/or other types of nonvolatile memory. Additional components of the information handling system 130 may include one or more disk drives, one or more network ports for communication with external devices as well as an input device 136 (e.g., keyboard, mouse, etc.) and video display 138. Information handling system 130 may also include one or more buses operable to transmit communications between the various hardware components.

Alternatively, systems and methods of the present disclosure may be implemented, at least in part, with non-transitory computer-readable media 140. Non-transitory computer-readable media 140 may include any instrumentality or aggregation of instrumentalities that may retain data and/or instructions for a period of time. Non-transitory computer-readable media 140 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Production operations in a subsea environment present optical challenges for DAS. For example, a maximum pulse power that may be used in DAS is approximately inversely proportional to fiber length due to optical non-linearities in the fiber. Therefore, the quality of the overall signal is poorer with a longer fiber than a shorter fiber. This may impact any operation that may utilize the DAS since the distal end of the fiber actually contains the interval of interest (i.e., the reservoir) in which downhole fiber 128 may be deployed. The interval of interest may include wellbore 122 and formation 104. For pulsed DAS systems such as the one exemplified in FIG. 2, an additional challenge is the drop-in signal to noise ratio (SNR) associated with the decrease in the number of light pulses that may be launched into the fiber per second (pulse rate) when interrogating fibers with overall lengths exceeding 10 km. As such, utilizing DAS in a subsea environment may have to increase the returned signal strength with given pulse power, increase the maximum pulse power that may be used for given fiber optic cable length, maintain the pulse power as high as possible as it propagates down the fiber optic cable length, and increase the number of light pulses that may be launched into the fiber optic cable per second.

Figure 32:
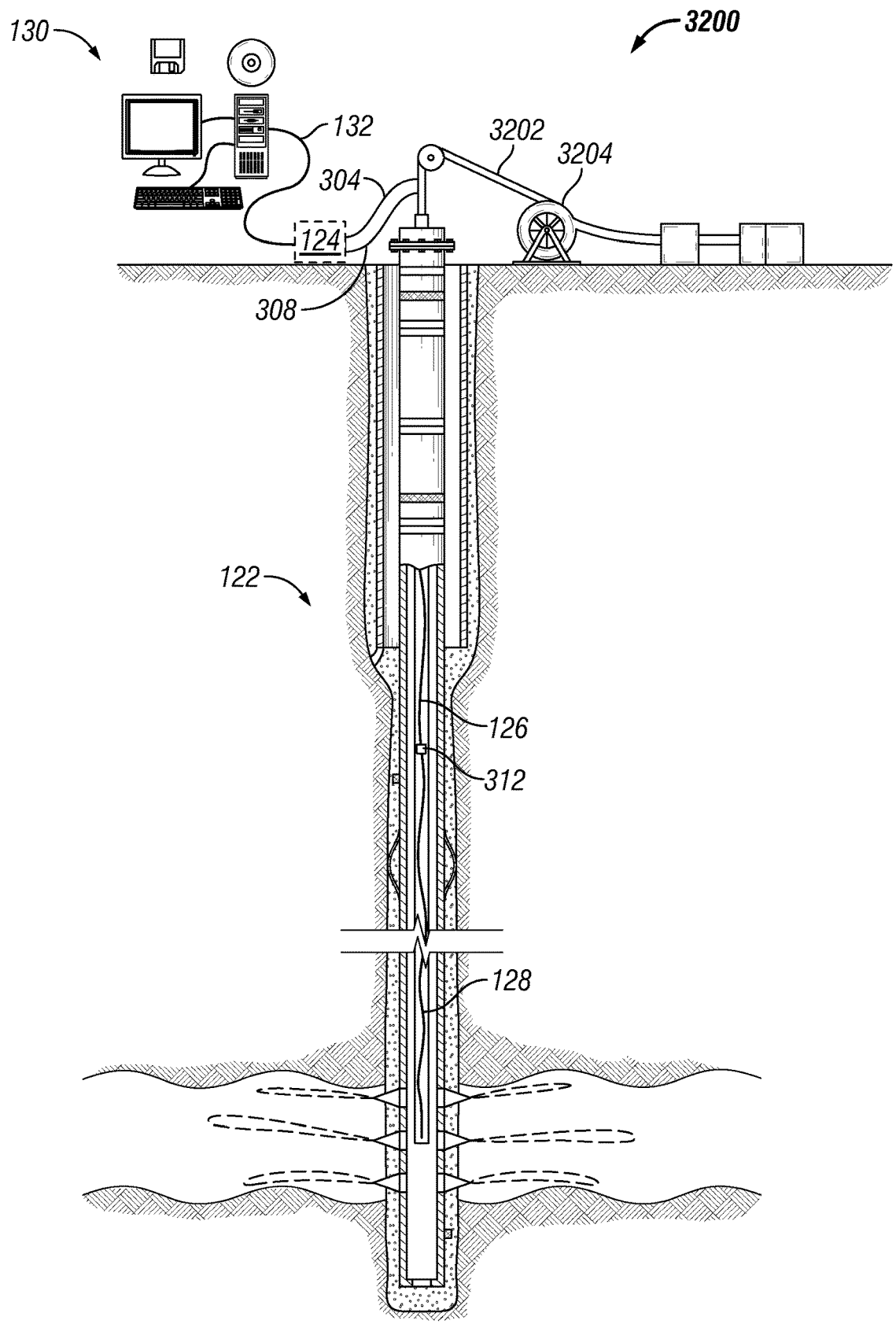
FIG. 32 illustrates an example of the well measurement system in a land-based operation.

FIG. 32 illustrates an example of a land-based well system 3200, which illustrates a coiled tubing operation. Without limitation, while a coiled tubing operation is shown, a wireline operation and/or the like may be utilized. As illustrated interrogator 124 is attached to information handling system 130. Further discussed below, lead lines may connect umbilical line 126 to interrogator 124. Umbilical line 126 may include a first fiber optic cable 304 and a second fiber optic cable 308 which may be individual lead lines. Without limitation, first fiber optic cable 304 and a second fiber optic cable 308 may attach to coiled tubing 3202 as umbilical line 126. Umbilical line 126 may traverse through wellbore 122 attached to coiled tubing 3202. In examples, coiled tubing 3202 may be spooled within hoist 3204. Hoist 3204 may be used to raise and/or lower coiled tubing 3202 in wellbore 122. Further illustrated in FIG. 20, umbilical line 126 may connect to distal circulator 312, further discussed below. Distal circulator 312 may connect umbilical line 126 to downhole fiber 128.

Figure 2:
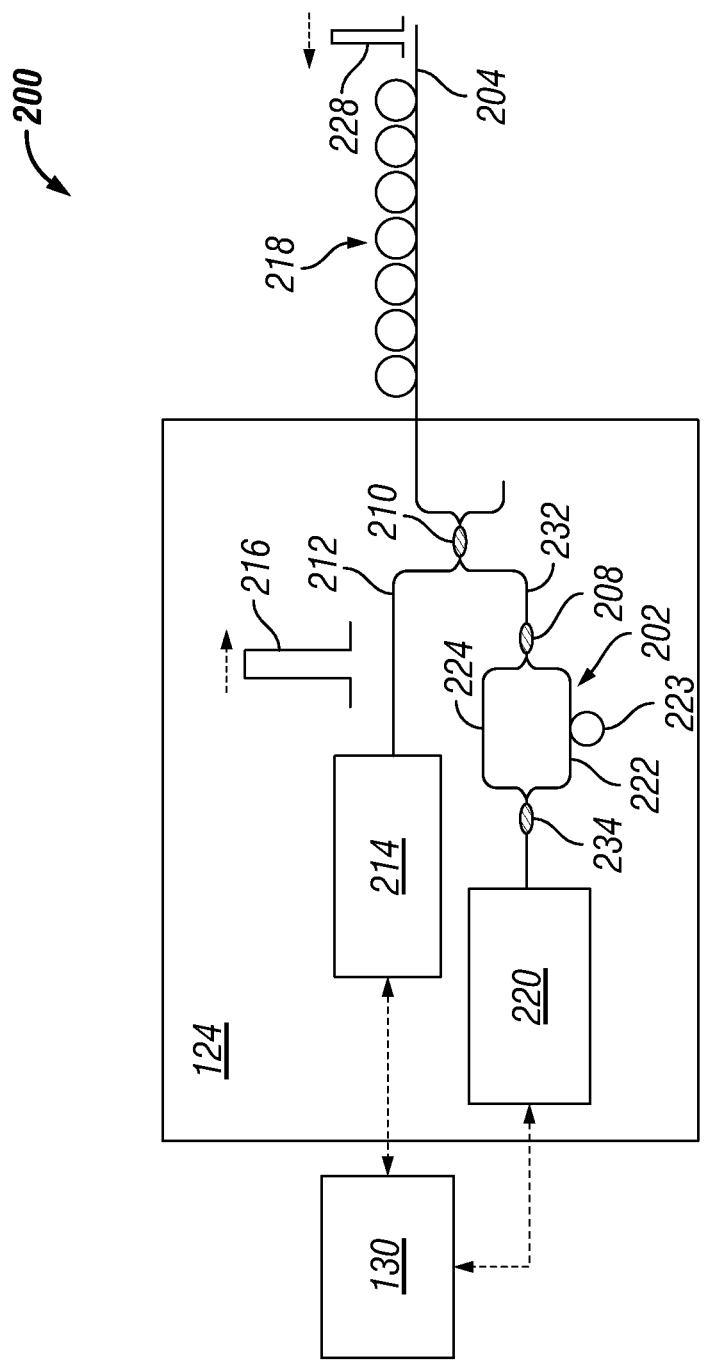
FIG. 2 illustrates an example of a DAS system.

FIG. 2 illustrates an example of DAS system 200. DAS system 200 may include information handling system 130 that is communicatively coupled to interrogator 124. Without limitation, DAS system 200 may include a single-pulse coherent Rayleigh scattering system with a compensating interferometer. In examples, DAS system 200 may be used for phase-based sensing of events in a wellbore using measurements of coherent Rayleigh backscatter or may interrogate a fiber optic line containing an array of partial reflectors, for example, fiber Bragg gratings.

As illustrated in FIG. 2, interrogator 124 may include a pulse generator 214 coupled to a first coupler 210 using an optical fiber 212. Pulse generator 214 may be a laser, or a laser connected to at least one amplitude modulator, or a laser connected to at least one switching amplifier, i.e., semiconductor optical amplifier (SOA). First coupler 210 may be a traditional fused type fiber optic splitter, a circulator, a PLC fiber optic splitter, or any other type of splitter known to those with ordinary skill in the art. Pulse generator 214 may be coupled to optical gain elements (not shown) to amplify pulses generated therefrom. Example optical gain elements include, but are not limited to, Erbium Doped Fiber Amplifiers (EDFAs) or Semiconductor Optical Amplifiers (SOAs).

DAS system 200 may include an interferometer 202. Without limitations, interferometer 202 may include a Mach-Zehnder interferometer. For example, a Michelson interferometer or any other type of interferometer 202 may also be used without departing from the scope of the present disclosure. Interferometer 202 may include a top interferometer arm 224, a bottom interferometer arm 222, and a gauge 223 positioned on bottom interferometer arm 222. Interferometer 202 may be coupled to first coupler 210 through a second coupler 208 and an optical fiber 232. Interferometer 202 further may be coupled to a photodetector assembly 220 of DAS system 200 through a third coupler 234 opposite second coupler 208. Second coupler 208 and third coupler 234 may be a traditional fused type fiber optic splitter, a PLC fiber optic splitter, or any other type of optical splitter known to those with ordinary skill in the art. Photodetector assembly 220 may include associated optics and signal processing electronics (not shown). Photodetector assembly 220 may be a semiconductor electronic device that uses the photoelectric effect to convert light to electricity. Photodetector assembly 220 may be an avalanche photodiode or a pin photodiode but is not intended to be limited to such.

When operating DAS system 200, pulse generator 214 may generate a first optical pulse 216 which is transmitted through optical fiber 212 to first coupler 210. First coupler 210 may direct first optical pulse 216 through a fiber optical cable 204. It should be noted that fiber optical cable 204 may be included in umbilical line 126 and/or downhole fiber 128 (e.g., FIG. 1). As illustrated, fiber optical cable 204 may be coupled to first coupler 210. As first optical pulse 216 travels through fiber optical cable 204, imperfections in fiber optical cable 204 may cause a portion of the light to be backscattered along fiber optical cable 204 due to Rayleigh scattering. Scattered light according to Rayleigh scattering is returned from every point along fiber optical cable 204 along the length of fiber optical cable 204 and is shown as backscattered light 228 in FIG. 2. This backscatter effect may be referred to as Rayleigh backscatter. Density fluctuations in fiber optical cable 204 may give rise to energy loss due to the scattered light, $\alpha_{scat}$, with the following coefficient:

$$\alpha_{scat} = \frac{8\pi^3}{3\lambda^4} n^8 p^2 k T_f \beta \qquad (1)$$

where n is the refraction index, p is the photoelastic coefficient of fiber optical cable 204, k is the Boltzmann constant, and β is the isothermal compressibility. $T_f$ is a fictive temperature, representing the temperature at which the density fluctuations are "frozen" in the material. Fiber optical cable 204 may be terminated with a low reflection device (not shown). In examples, the low reflection device (not shown) may be a fiber coiled and tightly bent to violate Snell's law of total internal reflection such that all the remaining energy is sent out of fiber optical cable 204.

Backscattered light 228 may travel back through fiber optical cable 204, until it reaches second coupler 208. First coupler 210 may be coupled to second coupler 208 on one side by optical fiber 232 such that backscattered light 228 may pass from first coupler 210 to second coupler 208 through optical fiber 232. Second coupler 208 may split backscattered light 228 based on the number of interferometer arms so that one portion of any backscattered light 228 passing through interferometer 202 travels through top interferometer arm 224 and another portion travels through bottom interferometer arm 222. Therefore, second coupler 208 may split the backscattered light from optical fiber 232 into a first backscattered pulse and a second backscattered pulse. The first backscattered pulse may be sent into top interferometer arm 224. The second backscattered pulse may be sent into bottom interferometer arm 222. These two portions may be re-combined at third coupler 234, after they have exited interferometer 202, to form an interferometric signal.

Interferometer 202 may facilitate the generation of the interferometric signal through the relative phase shift variations between the light pulses in top interferometer arm 224 and bottom interferometer arm 222. Specifically, gauge 223 may cause the length of bottom interferometer arm 222 to be longer than the length of top interferometer arm 224. With different lengths between the two arms of interferometer 202, the interferometric signal may include backscattered light from two positions along fiber optical cable 204 such that a phase shift of backscattered light between the two different points along fiber optical cable 204 may be identified in the interferometric signal. The distance between those points L may be half the length of the gauge 223 in the case of a Mach-Zehnder configuration, or equal to the gauge length in a Michelson interferometer configuration.

While DAS system 200 is running, the interferometric signal will typically vary over time. The variations in the interferometric signal may identify strains in fiber optical cable 204 that may be caused, for example, by seismic energy. By using the time of flight for first optical pulse 216, the location of the strain along fiber optical cable 204 and the time at which it occurred may be determined. If fiber optical cable 204 is positioned within a wellbore, the locations of the strains in fiber optical cable 204 may be correlated with depths in the formation in order to associate the seismic energy with locations in the formation and wellbore.

To facilitate the identification of strains in fiber optical cable 204, the interferometric signal may reach photodetector assembly 220, where it may be converted to an electrical signal. The photodetector assembly may provide an electric signal proportional to the square of the sum of the two electric fields from the two arms of the interferometer. This signal is proportional to:

$$P(t)=P1+P2+2*\sqrt{(P1P2)\cos(\phi 1-\phi 2)} \qquad (2)$$

where $P_n$ is the power incident to the photodetector from a particular arm (1 or 2) and $\phi_n$ is the phase of the light from the particular arm of the interferometer. Photodetector assembly 220 may transmit the electrical signal to information handling system 130, which may process the electrical signal to identify strains within fiber optical cable 204 and/or convey the data to a display and/or store it in computer-readable media. Photodetector assembly 220 and information handling system 130 may be communicatively and/or mechanically coupled. Information handling system 130 may also be communicatively or mechanically coupled to pulse generator 214.

Modifications, additions, or omissions may be made to FIG. 2 without departing from the scope of the present disclosure. For example, FIG. 2 shows a particular configuration of components of DAS system 200. However, any suitable configurations of components may be used. For example, pulse generator 214 may generate a multitude of coherent light pulses, optical pulse 216, operating at distinct frequencies that are launched into the sensing fiber either simultaneously or in a staggered fashion. For example, the photo detector assembly is expanded to feature a dedicated photodetector assembly for each light pulse frequency. In examples, a compensating interferometer may be placed in the launch path (i.e., prior to traveling down fiber optical cable 204) of the interrogating pulse to generate a pair of pulses that travel down fiber optical cable 204. In examples, interferometer 202 may not be necessary to interfere the backscattered light from pulses prior to being sent to photo detector assembly. In one branch of the compensation interferometer in the launch path of the interrogating pulse, an extra length of fiber not present in the other branch (a gauge length similar to that of gauge 223) may be used to delay one of the pulses. To accommodate phase detection of backscattered light using DAS system 200, one of the two branches may include an optical frequency shifter (for example, an acousto-optic modulator) to shift the optical frequency of one of the pulses, while the other may include a gauge. This may allow using a single photodetector receiving the backscatter light to determine the relative phase of the backscatter light between two locations by examining the heterodyne beat signal received from the mixing of the light from different optical frequencies of the two interrogation pulses.

In examples, DAS system 200 may generate interferometric signals for analysis by the information handling system 130 without the use of a physical interferometer. For instance, DAS system 200 may direct backscattered light to photodetector assembly 220 without first passing it through any interferometer, such as interferometer 202. Alternatively, the backscattered light from the interrogation pulse may be mixed with the light from the laser originally providing the interrogation pulse. Thus, the light from the laser, the interrogation pulse, and the backscattered signal may all be collected by photodetector assembly 220 and then analyzed by information handling system 130. The light from each of these sources may be at the same optical frequency in a homodyne phase demodulation system, or may be different optical frequencies in a heterodyne phase demodulator. This method of mixing the backscattered light with a local oscillator allows measuring the phase of the backscattered light along the fiber relative to a reference light source.

Figure 3:
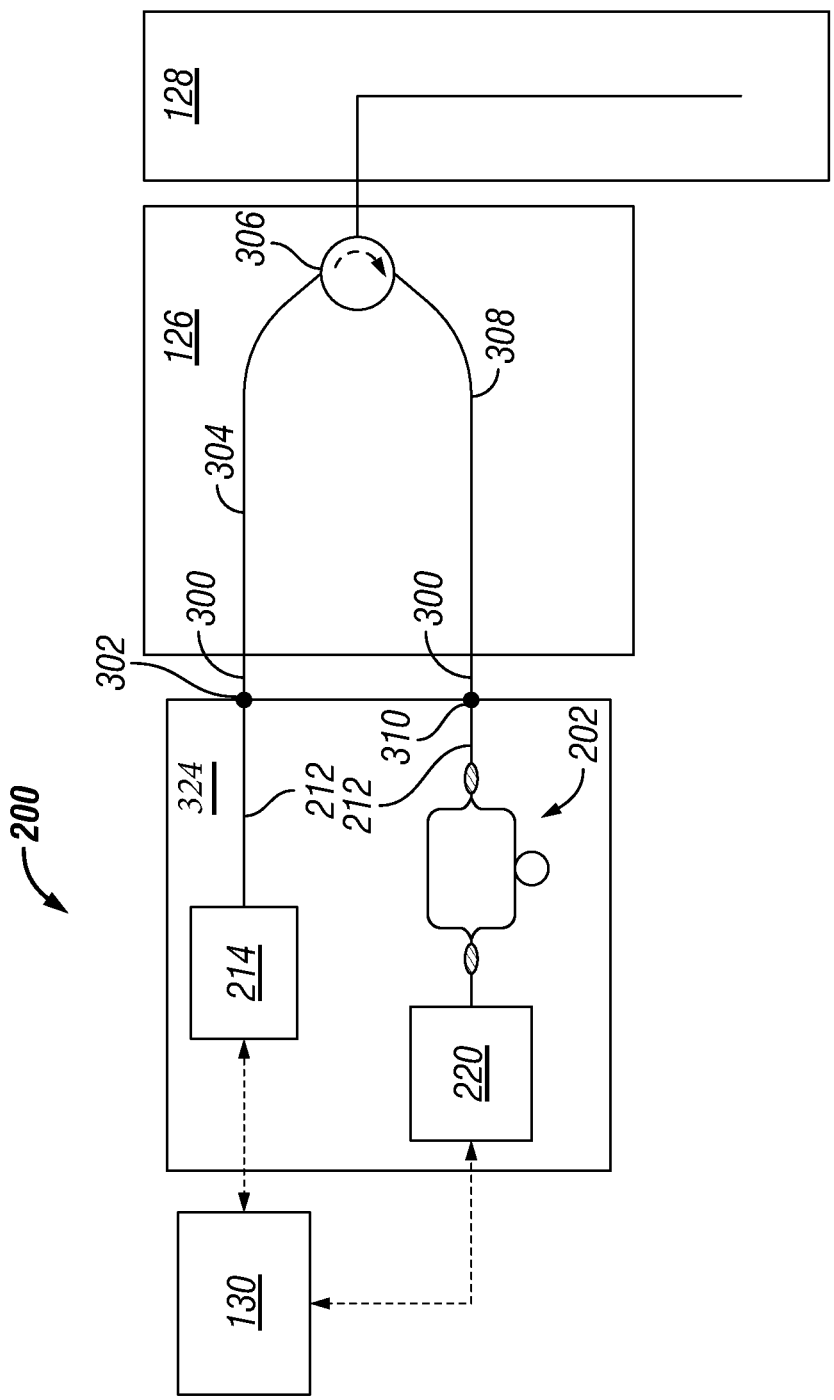
FIG. 3 illustrate the example of a DAS system with lead lines.

FIG. 3 illustrates an example of DAS system 200 system, which may be utilized to overcome challenges presented by a subsea environment. DAS system 200 may include interrogator 324, umbilical line 126, and downhole fiber 128. As illustrated, interrogator 324 may include pulse generator 214 and photodetector assembly 220, both of which may be communicatively coupled to information handling system 130. Additionally, interferometers. 202 may be placed within interrogator 324 and operate and/or function as described above. FIG. 3 illustrates an example of DAS system 200 in which lead lines 300 may be used. As illustrated, an optical fiber 212 may attach pulse generator 214 to an output 302, which may be a fiber Optic connector. Umbilical line 126 may attach to output 302 with a first fiber optic cable 304. First fiber optic cable 304 may traverse the length of umbilical line 126 to a remote circulator 306. Remote circulator 306 may connect first fiber optic cable 304 to second fiber optic cable 308. In examples, remote circulator 306 functions to steer light unidirectionally between one or more input and outputs of remote circulator 306. Without limitation, remote circulators 306 are three-port devices wherein light from a first port is split internally into two independent polarization states and wherein these two polarization states are made to propagate two different paths inside remote circulator 306. These two independent paths allow one or both independent light beams to be rotated in polarization state via the Faraday effect in optical media. Polarization rotation of the light propagating through free space optical elements within the circulator thus allows the total optical power of the two independent beams to uniquely emerge together with the same phase relationship from a second port of remote circulator 306.

Conversely, if any light enters the second port of remote circulator 306 in the reverse direction, the internal free space optical elements within remote circulator 306 may operate identically on the reverse direction light to split it into two polarizations states. After appropriate rotation of polarization states, these reverse in direction polarized light beams, are recombined, as in the forward propagation case, and emerge uniquely from a third port of remote circulator 306 with the same phase relationship and optical power as they had before entering remote circulator 306. Additionally, as discussed below, remote circulator 306 may act as a gateway, which may only allow chosen wavelengths of light to pass through remote circulator 306 and pass to downhole fiber 128. Second fiber optic cable 308 may attach umbilical line 126 to input 309. Input 309 may be a fiber optic connector which may allow backscatter light to pass into interrogator 324 to interferometer 202. Interferometer 202 may operate and function as described above and further pass back scatter light to photodetector assembly 220.

Figure 4:
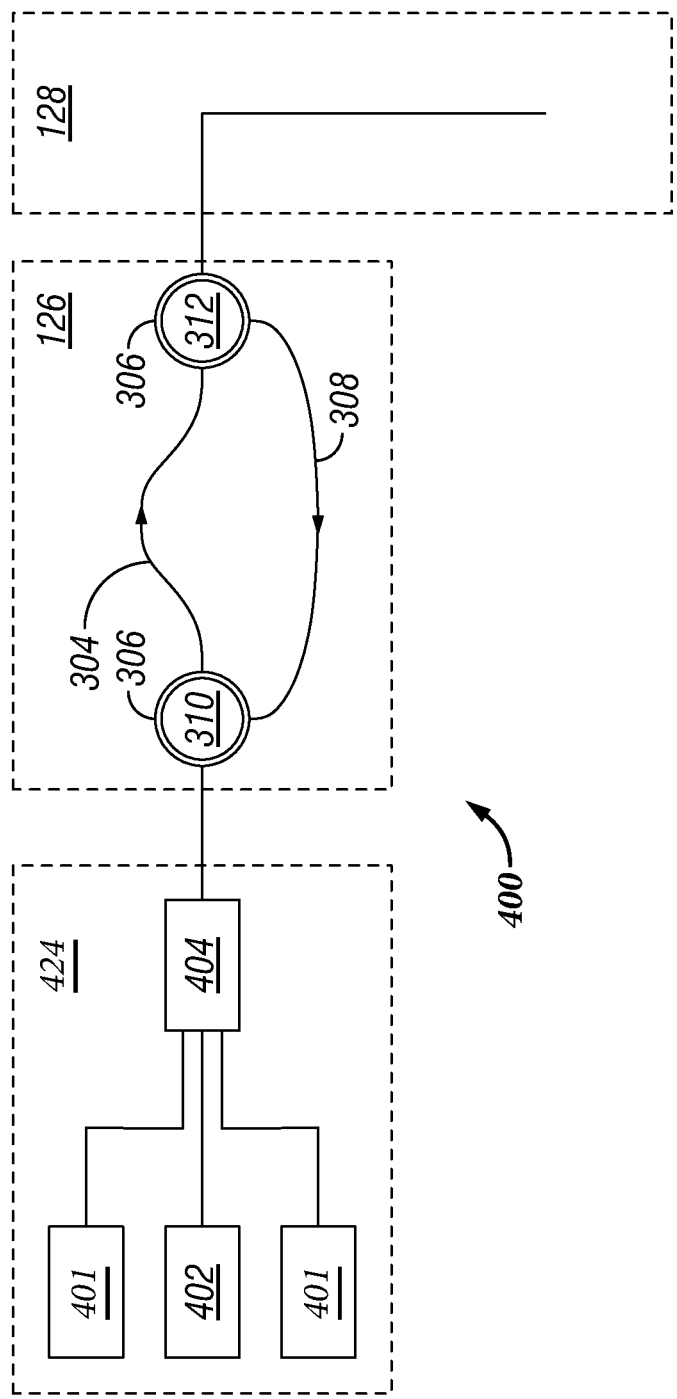
FIG. 4 illustrates a schematic of another example DAS system.

FIG. 4 illustrates another example of DAS system 400. As illustrated, interrogator 424 may include one or more DAS interrogator units 401, each emitting coherent light pulses at a distinct optical wavelength, and a Raman Pump 402 connected to a wavelength division multiplexer 404 (WDM) with fiber stretcher. Without limitation, WDM 404 may include a multiplexer assembly that multiplexes the light received from the one or more DAS interrogator units 401 and a Raman Pump 402 onto a single optical fiber and a demultiplexer assembly that separates the multi-wavelength backscattered light into its individual frequency components and redirects each single-wavelength backscattered light stream back to the corresponding DAS interrogator unit 401. In an example, WDM 404 may utilize an optical add-drop multiplexer to enable multiplexing the light received from the one or more DAS interrogator units 401 and a Raman Pump 402 and demultiplexing the multi-wavelength backscattered light received from a single fiber. WDM 404 may also include circuitry to optically amplify the multi-frequency light prior to launching it into the signal optical fiber and/or optical circuitry to optically amplify the multi-frequency backscattered light returning from the single optical fiber, thereby compensating for optical losses introduced during optical (de-)multiplexing. Raman Pump 402 may be a co-propagating optical pump based on stimulated Raman scattering, to feed energy from a pump signal to a main pulse from one or more DAS interrogator units 401 as the main pulse propagates down one or more fiber optic cables. This may conservatively yield a 3 dB improvement in SNR. As illustrated, Raman Pump 402 is located in interrogator 424 for co-propagation. In another example, Raman Pump 402 may be located topside after one or more remote circulators 306 either in line with first fiber optic cable 304 (co-propagation mode) and/or in line with second fiber optic cable 308 (counter-propagation). In another example, Raman Pump 402 is maninized and located after distal circulator 312 configured either for co-propagation or counter-propagation. In still another example, the light emitted by the Raman Pump 402 is remotely reflected by using a wavelength-selective filter beyond a remote circulator in order to provide amplification in the return path using a. Raman Pump 402 in any of the topside configurations outlined above.

Further illustrated in FIG. 4, WDM 404 with fiber stretcher may attach proximal circulator 310 to umbilical line 126. Umbilical line 126 may include one or more remote circulators 306, a first fiber optic cable 304, and a second fiber optic cable 308. As illustrated, a first fiber optic cable 304 and as second fiber optic cable 308 may be separate and individual fiber optic cables that may be attached at each end to one or more remote circulators 306. In examples, first fiber optic cable 304 and second fiber optic cable 308 may be different lengths or the same length and each may be an ultra-low loss transmission fiber that may have a higher power handling capability before non-literarily. This may enable a higher gain, co-propagation Raman amplification from interrogator 124.

Deploying first fiber optic cable 304 and as second fiber optic cable 308 from floating vessel 102 (e.g., referring to FIG. 1) to a subsea environment to a distal-end passive optical circulator arrangement, enables downhole fiber 128, which is a sensing fiber, to be below a remote circulator 306 (e.g., well-only) that may be at the distal end of DAS system 400. Higher (2-3x) pulse repetition rates, and non-saturated (non-back reflected) optical receivers may also be adjusted such that their dynamic range is optimized for downhole fiber 128. This may approximately yield a 3.5 dB improvement in SNR. Additionally, downhole fiber 128 may be a sensing fiber that has higher Rayleigh scattering coefficient (i.e., higher doping) which may be result in a ten times improvement in backscatter, which may yield a 7-dB improvement in SNR. In examples, remote circulators 306 may further be categorized as a proximal circulator 310 and a distal circulator 312. Proximal circulator 310 is located closer to interrogator 424 and may be located on floating vessel 102 or within umbilical line 126. Distal circulator 312 may be further away from interrogator 424 than proximal circulator 310 and may be located in umbilical line 126 or within wellbore 122 (e.g., referring to FIG. 1). As discussed above, a configuration illustrated in FIG. 3 may not utilize a proximal circulator 310 with lead lines 300.

Figure 5:
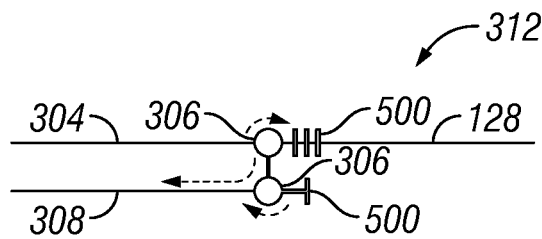
FIG. 5 illustrates an example of a remote circulator arrangement.

FIG. 5 illustrates another example of distal circulator 312, which may include two remote circulators 306. As illustrated, each remote circulator 306 may function and operate to avoid overlap, at interrogator 124, of backscattered light from two different pulses. For example, during operations, light at a first wavelength may travel from interrogator 124 down first fiber optic cable 304 to a remote circulator 306. As the light passes through remote circulator 306 the light may encounter a Fiber Bragg Grating 500. In examples, Fiber Bragg Grating 500 may be referred to as a filter mirror that may be a wavelength specific high reflectivity filter mirror or filter reflector that may operate and function to recirculate unused light back through the optical circuit for "double-pass" co/counter propagation induced DAS signal gain at 1550 nm. In examples, this wavelength specific "Raman light" mirror may be a dichroic thin film interference filter. Fiber Bragg Grating 500, or any other suitable optical filter that passes only the 1550 nm forward propagating DAS interrogation pulse light while simultaneously reflecting most of the residual Raman Pump light.

Without limitation, Fiber Bragg Grating 500 may be set-up, fabricated, altered, and/or the like to allow only certain selected wavelengths of light to pass. All other wavelengths may be reflected back to the second remote circulator, which may send the reflected wavelengths of light along second fiber optic cable 308 back to interrogator 124. This may allow Fiber Bragg Grating 500 to split DAS system 200 (e.g., referring to FIG. 4) into two regions. A first region may be identified as the devices and components before Fiber Bragg Grating 500 and the second region may be identified as downhole fiber 128 and any other devices after Fiber Bragg Grating 500.

Splitting DAS system 200 (e.g., referring to FIG. 4) into two separate regions may allow interrogator 124 (e.g., referring to FIG. 1) to pump specifically for an identified region. For example, the disclosed system of FIG. 4 may include one or more pumps, as described above, placed in interrogator 124 or after proximal circulator 310 at the topside either in line with first fiber optic cable 304 or second fiber optic cable 308 that may emit a wavelength of light that may travel only to a first region and be reflected by Fiber Bragg Grating 500. A second pump may emit a wavelength of light that may travel to the second region by passing through Fiber Bragg Grating 500. Additionally, both the first pump and second pump may transmit at the same time. Without limitation, there may be any number of pumps and any number of Fiber Bragg Gratings 500 which may be used to control what wavelength of light travels through downhole fiber 128. FIG. 5 also illustrates Fiber Bragg Gratings 500 operating in conjunction with any remote circulator 306, whether it is a distal circulator 312 or a proximal circulator 310. Additionally, as discussed below, Fiber Bragg Gratings 500 may be attached at the distal end of downhole fiber 218. Other alterations to DAS system 200 (e.g., referring to FIG. 4) may be undertaken to improve the overall performance of DAS system 200. For example, the lengths of first fiber optic cable 304 and second fiber optic cable 308 selected to increase pulse repetition rate (expressed in terms of the time interval between pulses $t_{rep}$).

Figure 6:
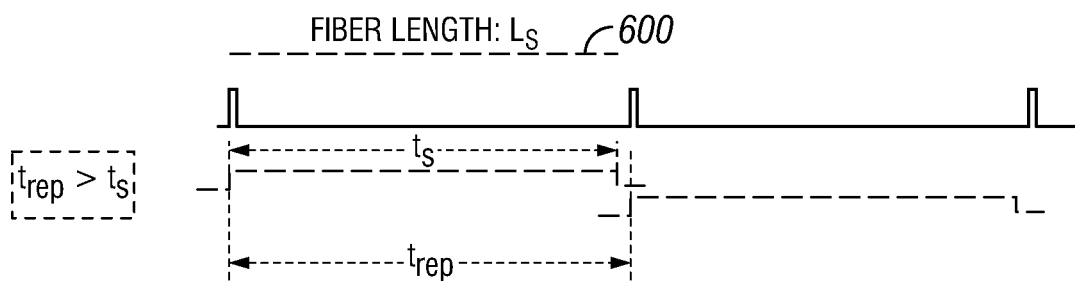
FIG. 6 illustrates a graph for determining time for a light pulse to travel in a fiber optic cable.

FIG. 6 illustrates an example of fiber optic cable 600 in which no remote circulator 306 may be used. As illustrated, at least a portion of fiber optic cable 600 is a sensor and the pulse interval may be greater than the time for the pulse of light to travel to the end of fiber optic cable 600 and its backscatter to travel back to interrogator 124 (e.g., referring to FIG. 1). This is so, since in DAS systems 200 at no point in time, backscatter from more than one location along sensing fiber (i.e., downhole fiber 128) may be received. Therefore, the pulse interval $t_{rep}$ may be greater than twice the time light takes to travel "one-way" down the fiber. Let $t_s$ be the "two-way" time for light to travel to the end of fiber optic cable 600 and back, which may be written as $t_{rep} > t_s$.

Figure 7:
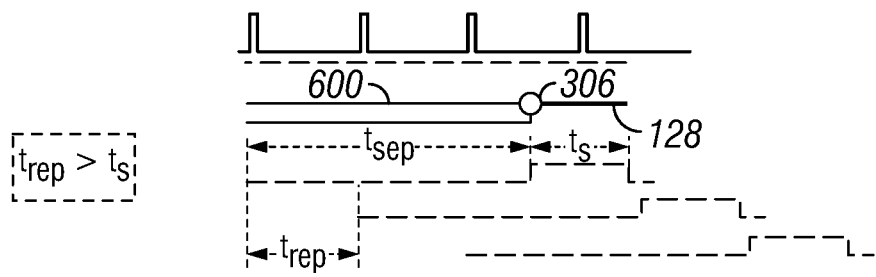
FIG. 7 illustrates another graph for determining time for a light pulse to travel in a fiber optic cable.

FIG. 7 illustrates an example of fiber optic cable 600 with a remote circulator 306 using the configuration shown in FIG. 3. When a remote circulator 306 is used, only the light traveling in fiber optic cable 600 that is allowed to go beyond remote circulator 306 and to downhole fiber 128 may be returned to interrogator 124 (e.g., referring to FIG. 1), thus, the interval between pulses is dictated only by the length of the sensing portion, downhole fiber 128, of fiber optic cable 600. It should be noted that all light must travel "to" and "from" the sensing portion, downhole fiber 128, with respect to pulse timing, what matters is the total length of fiber "to" and "from" remote circulator 306. Therefore, first fiber optic cable 304 or second fiber optic cable 308 may be longer than the other, as discussed above.

Figure 8:
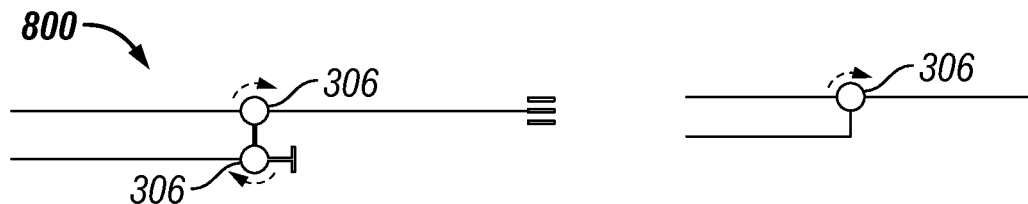
FIG. 8 illustrates an example of a remote circulator arrangement.

FIG. 8 illustrates an example remote circulator arrangement 800 which may allow, as described above, configurations that use more than one remote circulator 306 close together at the remote location. Although remote circulator arrangement 800 may have any number of remote circulators 306, remote circulator arrangement 800 may be illustrated as a single remote circulator 306.

Figure 9:
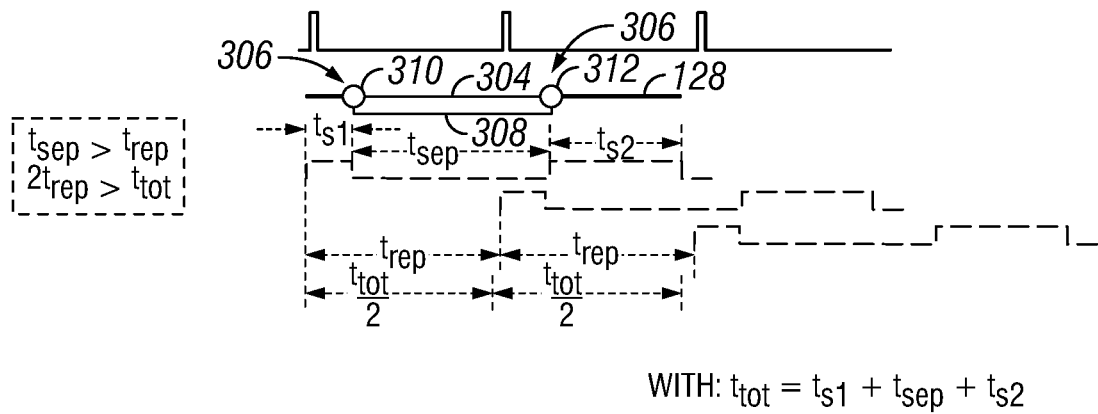
FIG. 9 illustrates another graph for determining time for a light pulse to travel in a fiber optic cable.
Figure 10A:
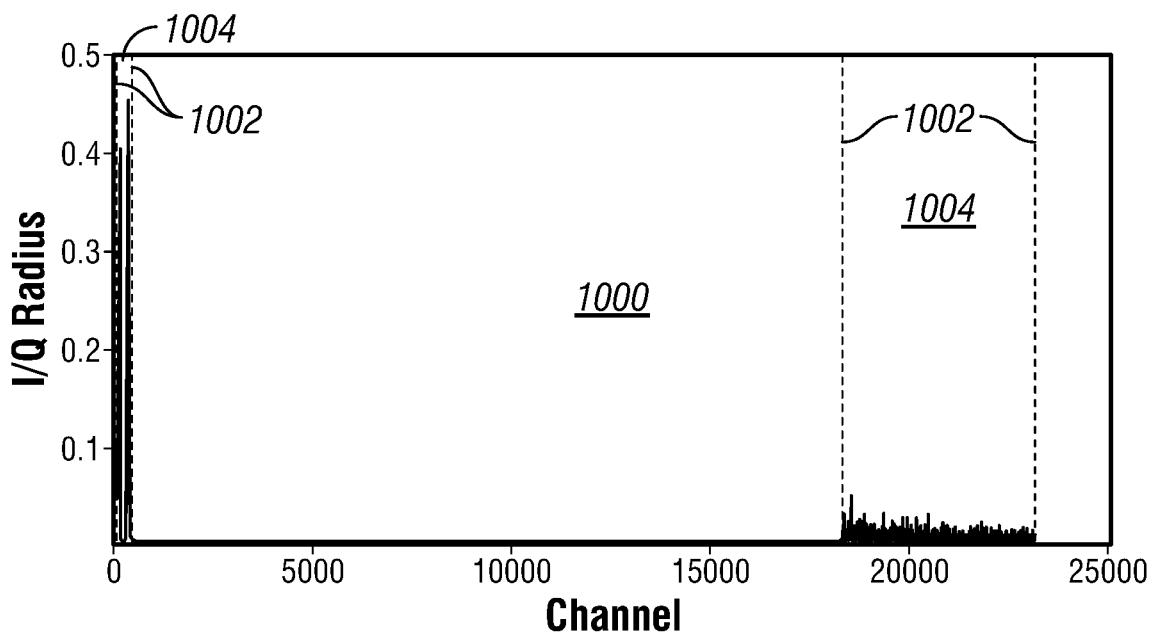
FIG. 10A illustrates a graph of sensing regions in the DAS system.
Figure 11:
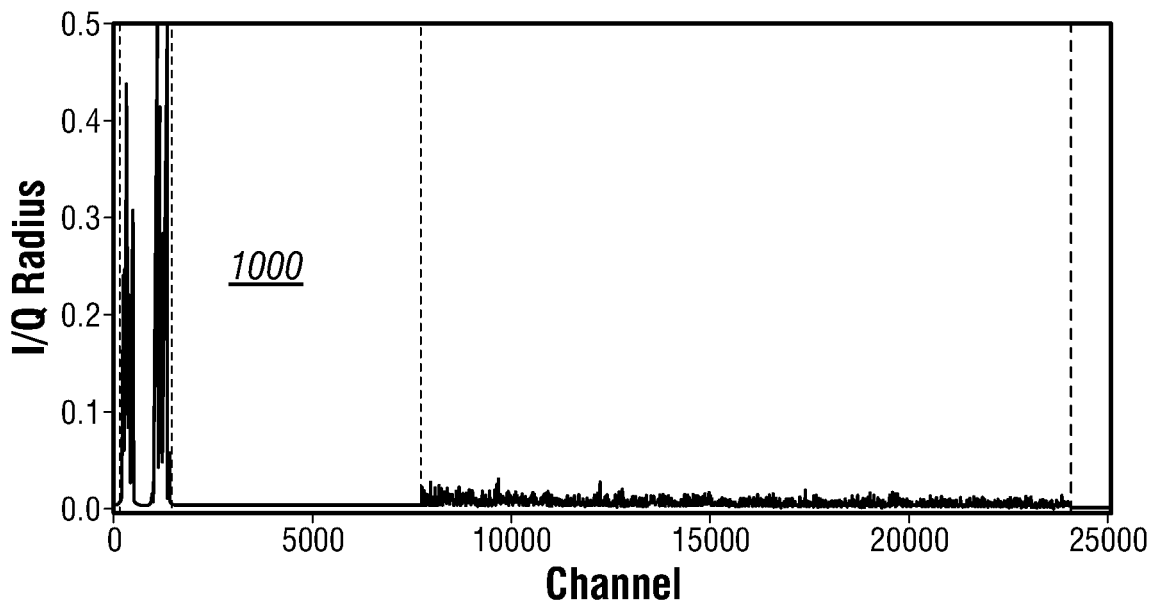
FIG. 11 illustrates a graph of optimized sampling frequencies in the DAS system.

FIG. 9 illustrates an example first fiber optic cable 304 and second fiber optic cable 308 attached to a remote circulator 306 at each end. As discussed above, each remote circulator may be categorized as a proximal circulator 310 and a distal circulator 312. When using a proximal circulator 310 and a distal circulator 312, light from the fiber section before proximal circulator 310, and light from the fiber section below the remote circulator 306 are detected, which is illustrated in FIGS. 10 and 11. There is a gap 1000 between them of "no light" that depends on the total length of fiber (summed) between proximal circulator 310 and a distal circulator 312.

Referring back to FIG. 9, with $t_{s1}$ the duration of the light from fiber sensing section before proximal circulator 310, $t_{sep}$ the "dead time" separating the two sections (and due to the cumulative length of first fiber optic cable 304 and second fiber optic cable 308 between proximal circulator 310 and a distal circulator 312), and $t_{s2}$ the duration of the light from the sensing fiber, downhole fiber 128, beyond distal circulator 312, the constraints on fiber lengths and pulse intervals may be identified as:

$$(i) t_{rep} < t_{sep} \qquad (3)$$

$$(ii)(2t_{rep}) > (t_{s1} t_{sep} t_{s2}) \qquad (4)$$

Criterion (i) ensures that "pulse n" light from downhole fiber 128 does not appear while "pulse n+1" light from fiber before proximal circulator 310 is being received at interrogator 124 (e.g., referring to FIG. 1). Criterion (ii) ensures that "pulse n" light from downhole fiber 128 is fully received before "pulse n+2" light from fiber before proximal circulator 310 is being received at interrogator 124 is received. It should be noted that the two criteria given above only define the minimum and maximum $t_{rep}$ for scenarios where two pulses are launched in the fiber before backscattered light below the remote circulator 306 is received. However, it should be appreciated that for those skilled in the art these criteria may be generalized to cases where n∈{1, 2, 3, . . . } light pulses may be launched in the fiber before backscattered light below the remote circulator 306 is received.

Figure 12:
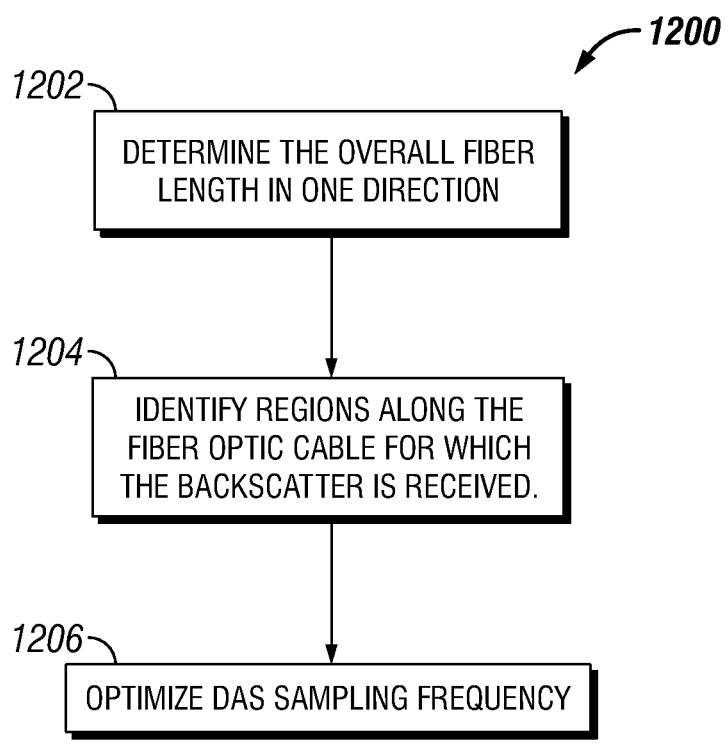
FIG. 12 illustrates an example of a workflow for optimizing the sampling frequencies of the DAS system.

The use of remote circulators 306 (e.g., referring to FIG. 3) may allow for DAS system 200 (e.g., referring to FIG. 3) to increase the sampling frequency. FIG. 12 illustrates workflow 1200 for optimizing sampling frequency when using a remote circulator 306 in DAS system 200. Workflow 1200 may begin with block 1202, which determines the overall fiber length in both directions. For example, a 17 km of first fiber optic cable 304 (e.g., referring to FIG. 3) and 17 km of second fiber optic cable 308 (e.g., referring to FIG. 3) before distal circulator 312 (e.g., referring to FIG. 3) and 8 km of sensing fiber, downhole fiber 128 (e.g., referring to FIG. 3), after distal circulator 312, the overall fiber optic cable length in both directions would be 50 km. Assuming a travel time of the light of 5 ns/m, the following equation may be used to calculate a first DAS sampling frequency $f_s$.

$$f_s = \frac{1}{t_s} = \frac{1}{5 \cdot 10^{-9} \cdot z} \qquad (5)$$

where $t_s$ is the DAS sampling interval and z is the overall two-way fiber length. Thus, for an overall two way fiber length of 50 km the first DAS sampling rate $f_s$ is 4 kHz. In block 1204 regions of the fiber optic cable are identified for which backscatter is received. For example, this is done by calculating the average optical backscattered energy for each sampling location followed by a simple thresholding scheme. The result of this step is shown in FIG. 10A where boundaries 1002 identify two sensing regions 1004. As illustrated in FIG. 10, optical energy is given as:

$$I^2 + Q^2 \qquad (6)$$

where I and Q correspond to the in-phase (I) and quadrature (Q) components of the backscattered light. In block 1206, the sampling frequency of DAS system 200 is optimized. To optimize the sampling frequency a minimum time interval is found that is between the emission of light pulses such that at no point in time backscattered light arrives back at interrogator 124 (e.g., referring to FIG. 1) that corresponds to more than one spatial location along a sensing portion of the fiber-optic line. Mathematically, this may be defined as follows. Let S be the set of all spatial sample locations x along the fiber for which backscattered light is received. The desired light pulse emission interval $t_s$ is the smallest one for which the cardinality of the two sets S and $\{mod(x, t_s): x \in S\}$ is still identical, which is expressed as:

$$\min_{t_s}(t_s) \text{ s.t. } |S| = |\{mod(x, t_s) : x \in S\}| \qquad (7)$$

where |•| is the cardinality operator, measuring the number of elements in a set. FIG. 11 shows the result of optimizing the sampling frequency from FIG. 10 with workflow 1200. Here, the DAS sampling frequency may increase from 4 kHz to 12.5 kHz without causing any overlap in backscattered locations, effectively increasing the signal to noise ratio of the underlying acoustic data by more than 5 dB due to the increase in sampling frequency.

Figure 13:
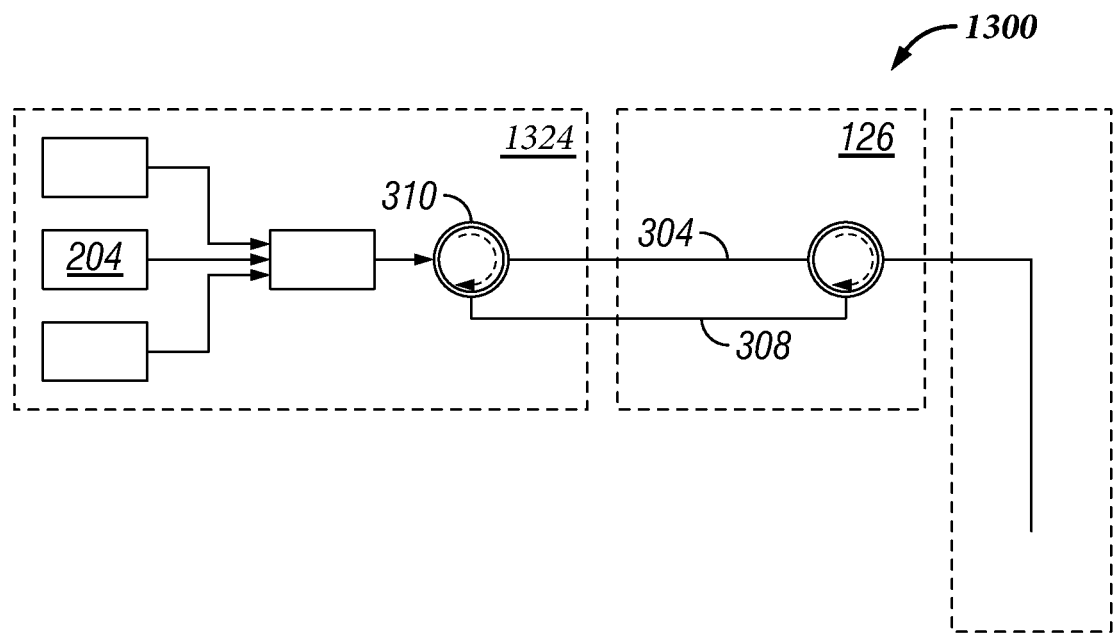
FIGS. 13-26 illustrate different examples of the DAS system.
Figure 14:
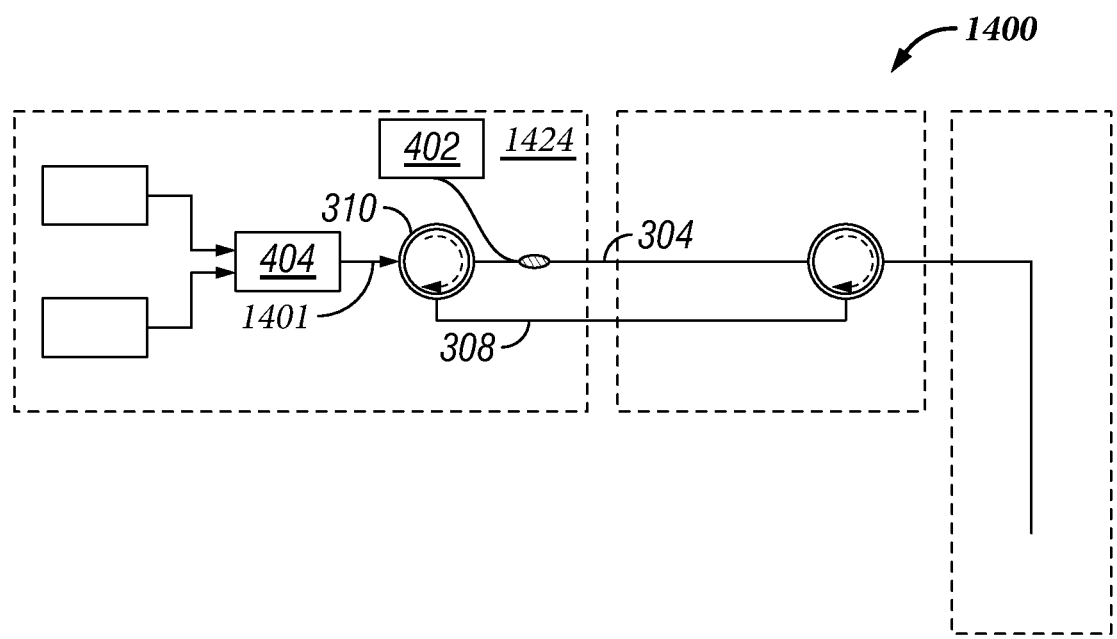

Variants of DAS system 200 may also benefit from workflow 1200. For example, FIG. 13 illustrates DAS system 1300 in which proximal circulator 310 is placed within interrogator 1324. This system set up of DAS system 1300 may allow for system flexibility on how to implement during measurement operations and the efficient placement of Raman Pump 402 in another illustrated example of DAS system 1400, referring to FIG. 14. As illustrated in FIGS. 13 and 14, first fiber optic cable 304 and second fiber optic cable 308 may connect interrogator 124 to umbilical line 126, which is described in greater detail above in FIG. 3.

FIG. 14 illustrates another example of DAS system 1400 having an interrogator 1424 in which Raman Pump 402 is operated in co-propagation mode and is attached to first fiber optic cable 304 after proximal circulator 310. For example, if the first sensing region before proximal circulator 310 should not be affected by Raman amplification. Moreover, Raman Pump 402, may also be attached to second fiber optic cable 308 which may allow the Raman Pump 402 to be operated in counter-propagation mode. In examples, the Raman Pump may also be attached to fiber 1401 between WDM 404 and proximal circulator 310 in interrogator 1424.

Figure 15:
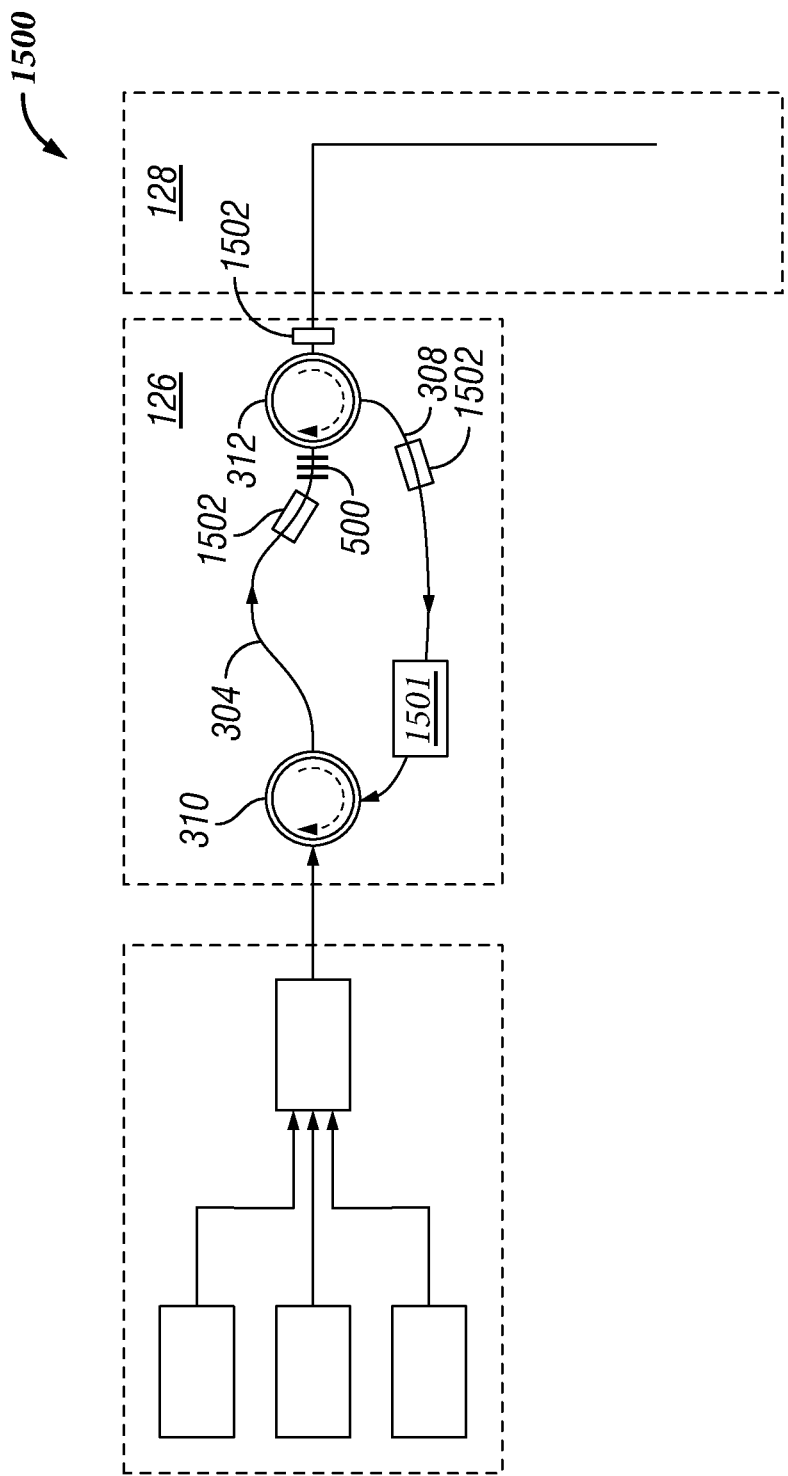

FIG. 15 illustrates another example of DAS system 1500 in which an optical amplifier assembly 1501 (i.e., an Erbium doped fiber amplifier (EDFA)+Fabry-Perot filter) may be attached to proximal circulator 310, which may also be identified as a proximal locally pumped optical amplifier. In examples, a distal optical amplifier assembly 1502 may also be attached at distal circulator 312 on first fiber optical cable 304 or second fiber optical cable 308 as an inline or "mid-span" amplifier. In examples, optical amplifier assembly 1502 located in-line with fiber optical cable 304 and above distal circulator 312 may be used to boost the light pulse before it is launched into the downhole fiber 128. Referring to FIGS. 10B and 10C, the effect of using an optical amplifier assembly 1501 in-line with a second fiber optic cable 308 prior to proximal circulator 310 and/or using an distal optical amplifier assembly 1502 located in line with second fiber optical cable 308 above distal circulator 312 may allow for selectively amplifying the backscattered light originating from downhole fiber 128 which tends to suffer from much stronger attenuation as it travels back along downhole fiber 128 and second fiber optical cable 308 than backscattered light originating from shallower sections of fiber optic cable that may also perform sensing functions. FIG. 10B illustrates measurements where proximal circulator 310 is active (optical amplifier assembly 1501 in-line with a second fiber optic cable 308 prior to proximal circulator 310 and/or distal optical amplifier assembly 1502 located in line with second fiber optical cable 308 above distal circulator 312 is used). FIG. 10C illustrates measurements where proximal circulator 310 is passive (no optical amplification is used in-line with second fiber optic cable 308). In FIGS. 10B and 10C, boundaries 1002 identify two sensing regions 1004. Additionally, in FIGS. 10B and 10C the DAS sampling frequency is set to 12.5 kHz using workflow 1200. Further illustrated Fiber Bragg Grating 500 may also be disposed on first fiber optical cable 304 between distal optical amplifier assembly 1502 and distal circulator 312.

Figure 16:
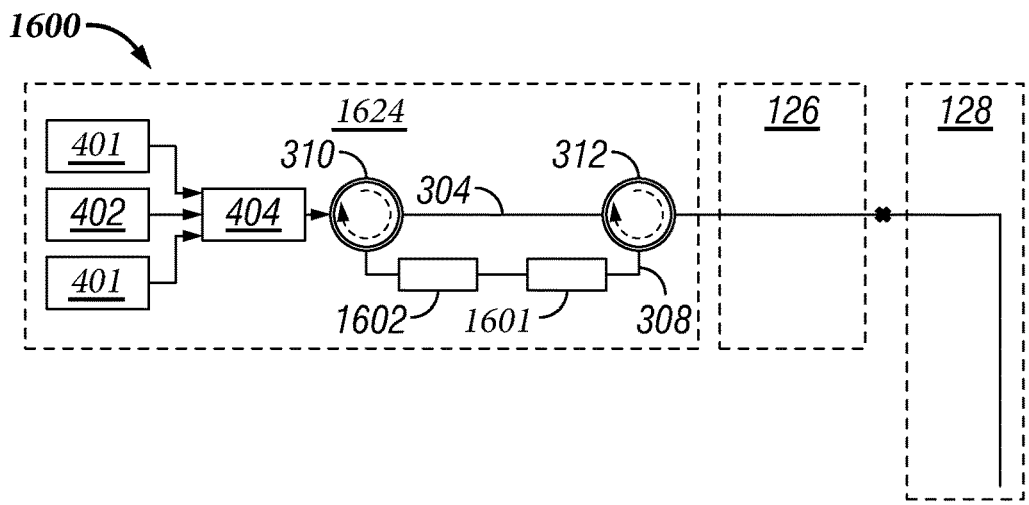

FIG. 16 illustrates another example of DAS system 1600 in which proximal circulator 310 and distal circulator 312 are disposed within interrogator 1624. Without limitation, proximal circulator 310 and distal circulator 312 may be disposed outside of interrogator 1624 as a separate device but position on but may still be disposed on floating vessel 102 (e.g., referring to FIG. 1) and/or above the water or earth surface. Similar to FIG. 4 above, interrogator 1624 may include one or more DAS interrogator units 401, a Raman Pump 402, and a WDM 404 all of which may operate and function according to the description above. As described above, interrogator 1624 is attached to umbilical line 126, which is attached to downhole fiber 128. Additionally, first fiber optic cable 304 and second fiber optic cable 308 may connect proximal circulator 310 and distal circulator 312. As illustrated in FIG. 16, second fiber optic cable 308 may be connected to an optical shutter 1601 which protects an erbium-doped fiber amplifier (EDFA) 1602. The output from EDFA 1602 may connect second fiber optic cable 308 to proximal circulator 310. This example may allow for selective amplification, which may allow for the separation of the optical path into a discrete down and up going paths. The up going path being second fiber optic cable 308 and the down going path being first fiber optic cable 304. In examples optical shutter 1601 is closed a down going pulse of light traverses through distal circulator 312 and may remain close until such time that a backscattered light from downhole fiber 128 approaches optical shutter 1601 in second fiber optic cable 308. This may allow for selective amplification of light from downhole fiber 128 and may prevent all backscattered light, unless specifically chosen, from reaching EDFA 1602.

Figure 17:
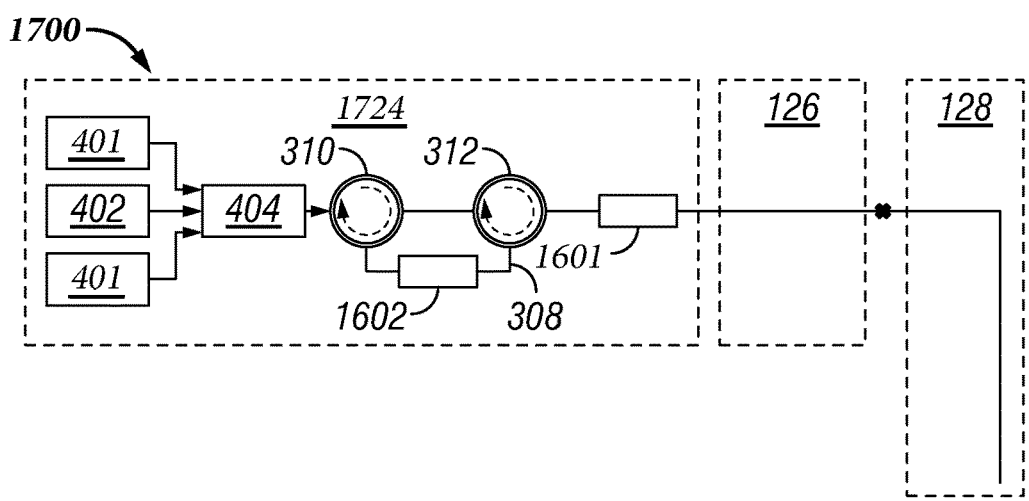

FIG. 17 illustrates another example DAS system 1700 in which optical shutter 1601 is disposed in interrogator 1724 and between distal circulator 312 and umbilical line 126. Additionally, EDFA 1602 is disposed on second fiber optic cable 308 between proximal circulator 310 and distal circulator 312. Optical shutter 1601 and EDFA 1602 may still operate and function as described above in FIG. 16.

Figure 18:
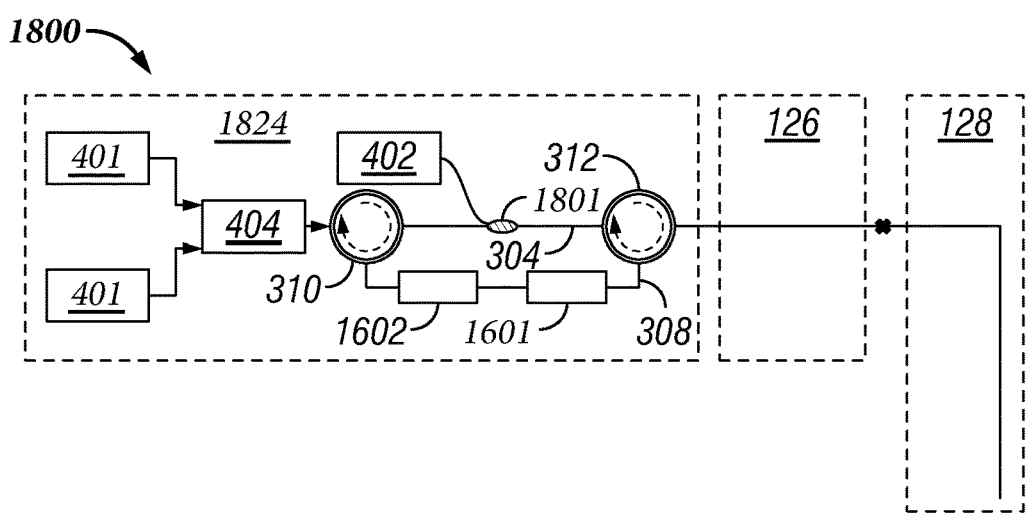

FIG. 18 illustrates another example DAS system 1800 in which, as illustrated in FIG. 16, optical shutter 1601 and EDFA 1602 are disposed between proximal circulator 310 and distal circulator 312 on second fiber optic cable 308. In addition, Raman Pump 402 may be attached to WDM pump 1801 which is disposed on first fiber optic cable 304. Raman Pump 402 and WDM pump 1801 may operate and function as described in FIG. 14 above.

Figure 19:
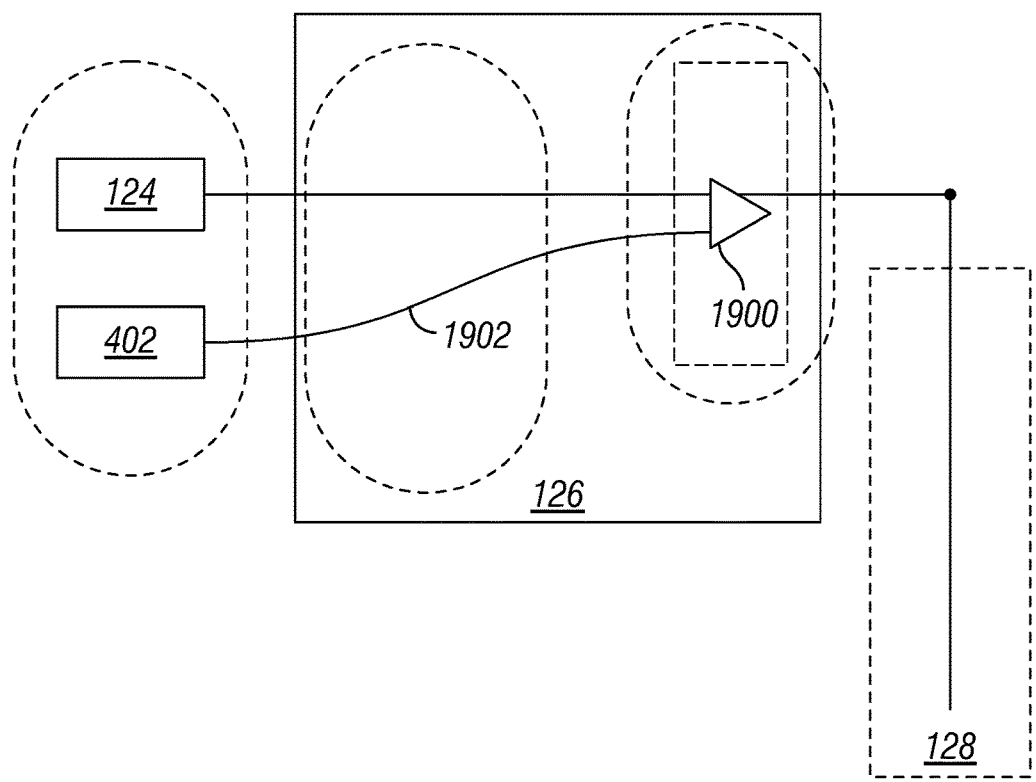

FIG. 19 illustrates an example including an optical amplifier 1900. Optical amplifier 1900 may function and operate by stimulated optical emission within a semiconductor optical amplifier (SOA) using a material such as InGsAsP or by stimulated emission of excited erbium ions within an Erbium doped fiber amplifier (EDFA) or via non-linear optical energy conversion using stimulated Raman processes, whereby optical energy is added to the signal light in the optical domain. Optical amplifiers may be pumped or excited via direct electron injection in the case of the SOA or by local optical pumping, via laser diode, or remote all-optical pumping of an EDFA or Distributed Raman Amplification along the fiber itself. In example, optical amplifier 1900 is disposed in umbilical line 126. Umbilical line 126 is attached to interrogator 124 at one end and downhole fiber 128 at the opposite end. As illustrated, optical amplifier 1900 may be attached to shortwave optical Pump laser 402 at 1480 nm by pump laser fiber 1902, which may also be disposed in umbilical line 126. As illustrated optical Pump laser 402 may operate and function to excite the optical gain medium within the optical amplifier 1900 by providing additional optical energy into the amplifier gain medium.

Figure 20:
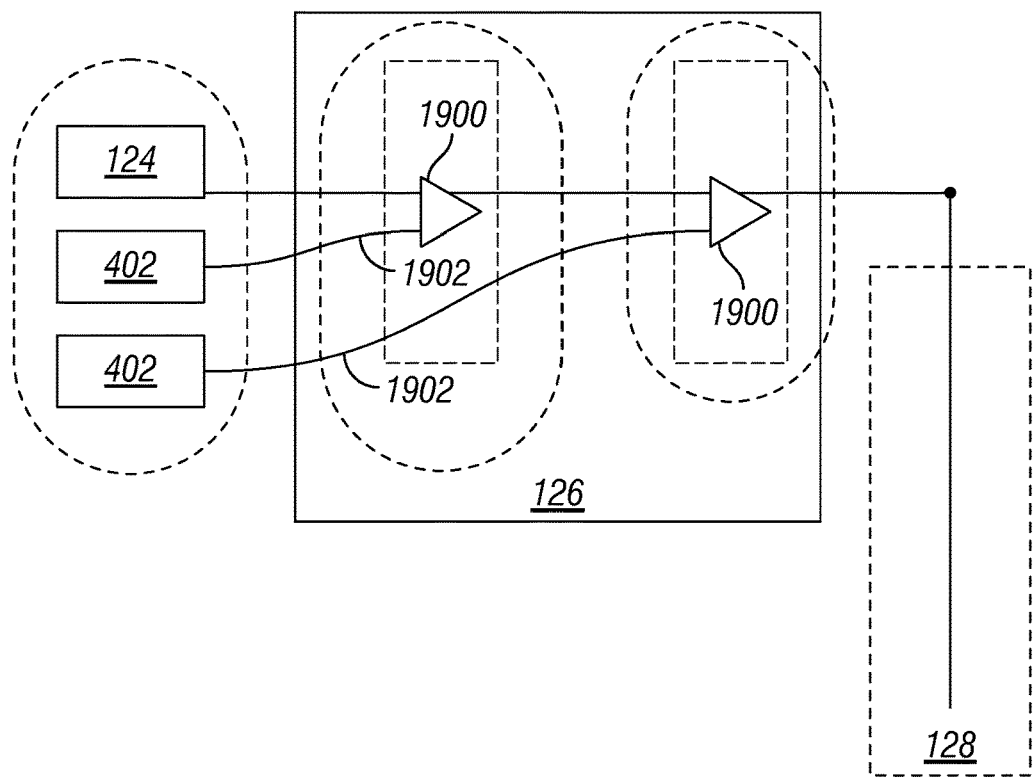

FIG. 20 illustrates an example of two optical amplifiers 1900 disposed in umbilical line 126. In examples, each optical amplifier 1900 may be disposed in series or in parallel with each other. As illustrated, optical amplifiers 1900 are disposed in series, which may allow for reduction in non-linear amplification at each stage whereby the effective signal gain is provided via summing of multiple gain stages. As illustrated, each optical amplifier 1900 may be powered by a Raman Pump 402 connected by an individual pump laser fiber 1902. In additional examples, a single Raman Pump 402 may be connected to each optical amplifier 1900 by a single pump laser fiber 1902 or two pump laser fibers 1902.

Figure 21:
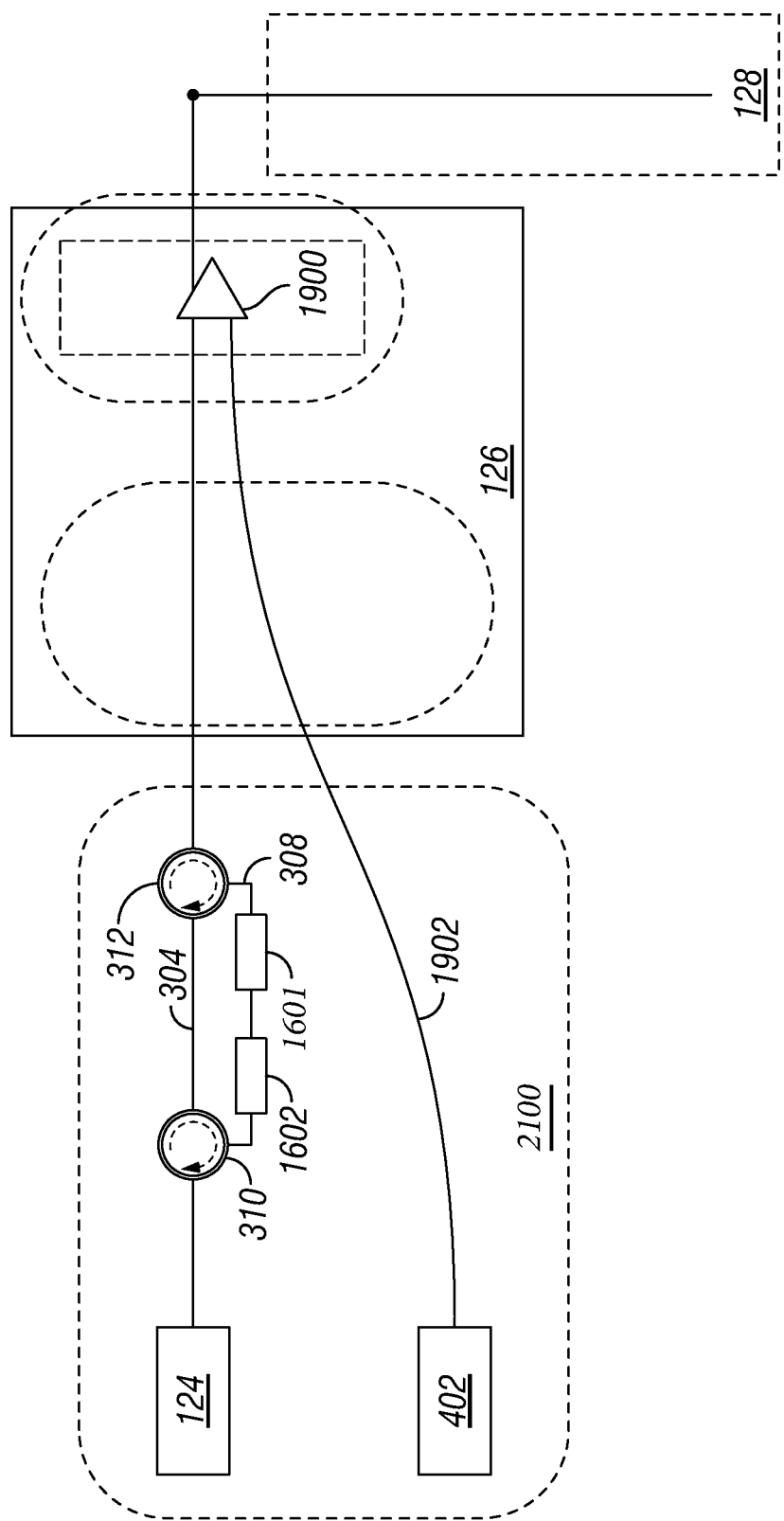

FIG. 21 illustrates another example in which optical amplifier 1900 is disposed in umbilical line 126 and a proximal circulator 310 and a distal circulator 312 are disposed between interrogator 2124 and umbilical liner 126 on surface 2100. Surface 2100 is defined as on vessel 102 (e.g., referring to FIG. 1) or in any suitable place above a body of water. As discussed above in FIGS. 16-18, distal circulator 312 and proximal circulator 310 may be connected by a first fiber optic cable 304 and a second fiber optic cable 308. As illustrated, optical shutter 1601 and EDFA 1602 are disposed between proximal circulator 310 and distal circulator 312 on second fiber optic cable 308. In this example, optical shutter 1600, EDFA 1602, and optical amplifier 1900 operate and function as described above.

Figure 22:
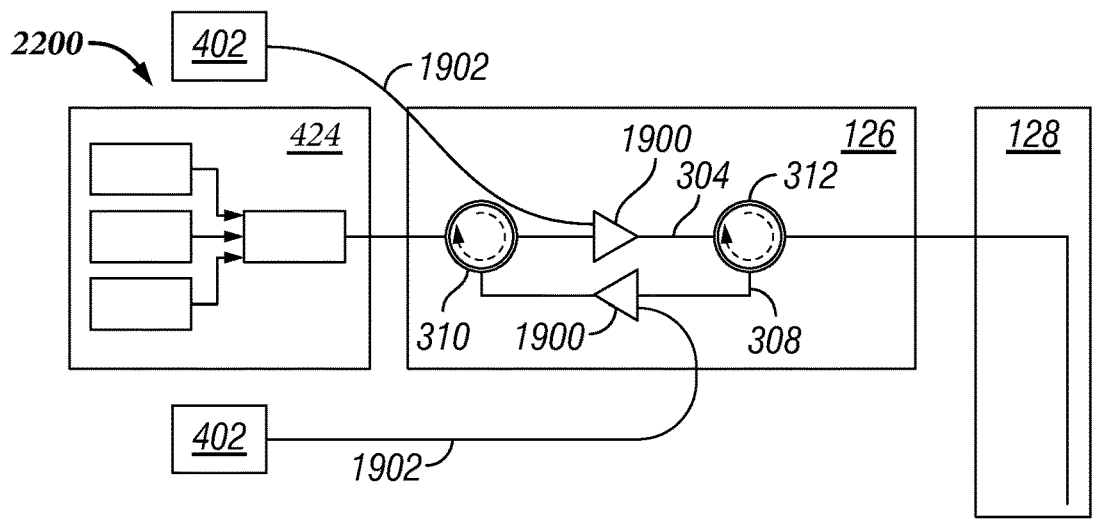
Figure 23:
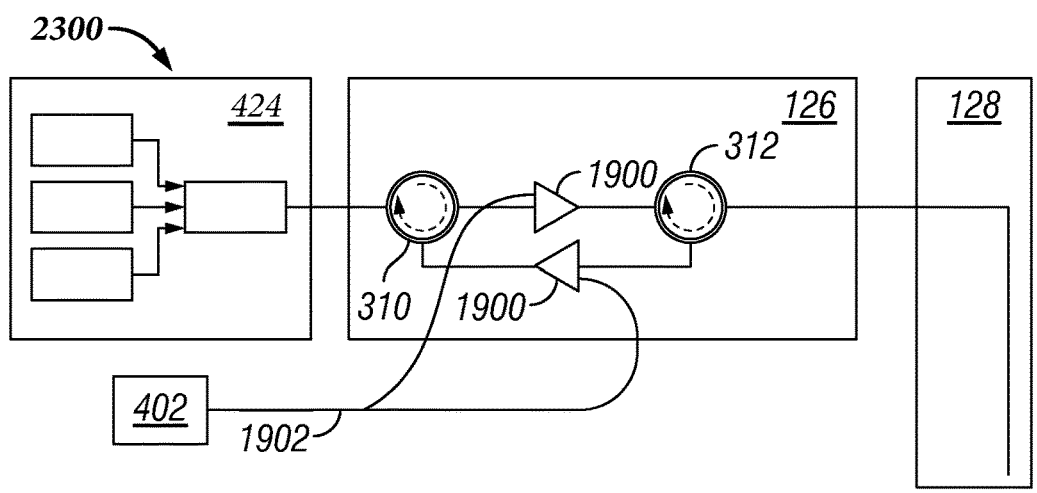
Figure 24:
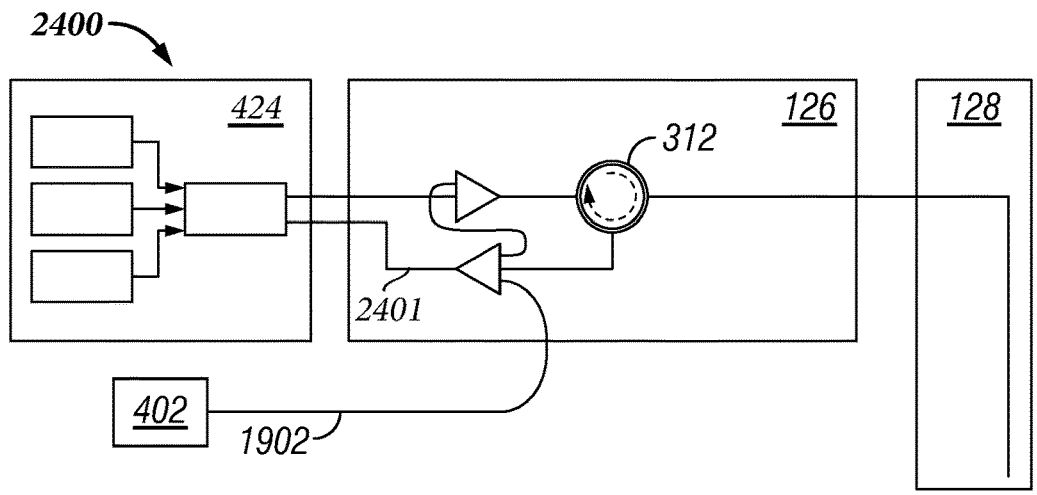

FIG. 22 illustrates an example DAS system 2200 that includes two optical amplifiers 1900 disposed in umbilical line 126 with proximal circulator 310 and distal circulator 312. In examples distal circulator 312 and proximal circulator 310 may be connected by a first fiber optic cable 304 and a second fiber optic cable 308. As illustrated, an optical amplifier 1900 is disposed in first fiber optic cable 304 and second fiber optic cable 308. As noted above, each optical amplifier 1900 is powered by an optical Pump laser 402 that is connected to optical amplifier 1900 by a pump laser fiber 1902. In this example, optical amplifiers 1900 may operate and function to provide quasi distributed signal gain at multiple locations along said fiber. FIG. 23 illustrates the same setup as FIG. 22 but in this example DAS system 2300 each optical amplifier 1900 is connected to a single pump laser fiber 1902, which is connected to a single Raman Pump 402. FIG. 24 illustrates another example DAS system 2400 with the same setup as FIG. 23, however in this example proximal circulator 310 (e.g., referring got FIG. 23) has been removed, leaving distal circulator 312. In this example, the removal of proximal circulator 310 may allow for both forward and return amplification with the proximal circulator replaced with a second return fiber 2401.

Figure 25:
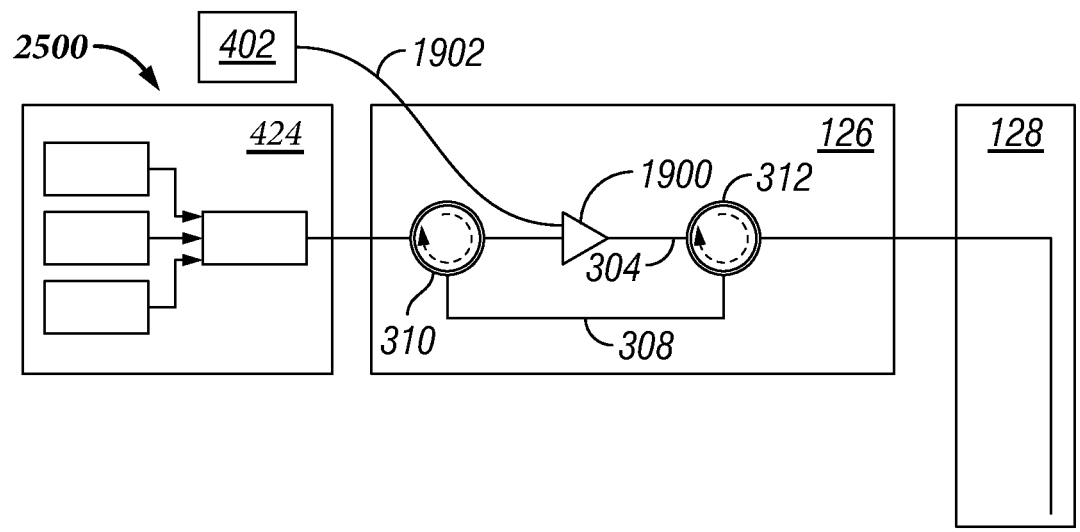
Figure 26:
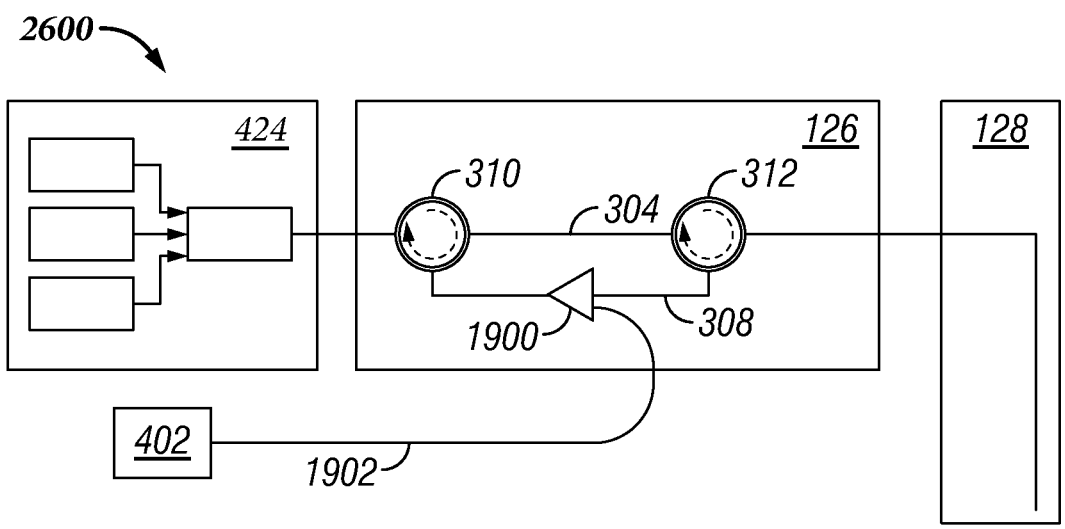

FIG. 25 illustrates an example DAS system 2500 that an optical amplifier 1900 disposed in umbilical line 126 with proximal circulator 310 and distal circulator 312. As discussed above, optical amplifier 1900 is connected to the optical Pump laser 402 by pump laser fiber 1902. In examples distal circulator 312 and proximal circulator 310 may be connected by a first fiber optic cable 304 and a second fiber optic cable 308. As illustrated, an optical amplifier 1900 is disposed in first fiber optic cable 304. In this example, optical amplifier 1900 may operate and function as a single stage remotely-pumped EDFA or other lumped optical amplifier along the outgoing transmission fiber. Remote pumping of lumped in-line amplifiers allows tailoring of signal strengths for optimum signal-to-noise ratios. FIG. 26 illustrates another example DAS system 2600, with a similar setup of FIG. 25 with optical amplifier 1900 disposed in second fiber optic cable 308 and not in first fiber optic cable 304. As discussed above, optical amplifier 1900 is connected to Raman Pump 402 by pump laser fiber 1902. In this example, optical amplifier 1900 may operate and function as a single stage remotely-pumped EDFA or other lumped optical amplifier along the returning transmission fiber. Remote pumping of lumped in-line amplifiers allows tailoring of signal strengths for optimum signal-to-noise ratios.

Figure 27:
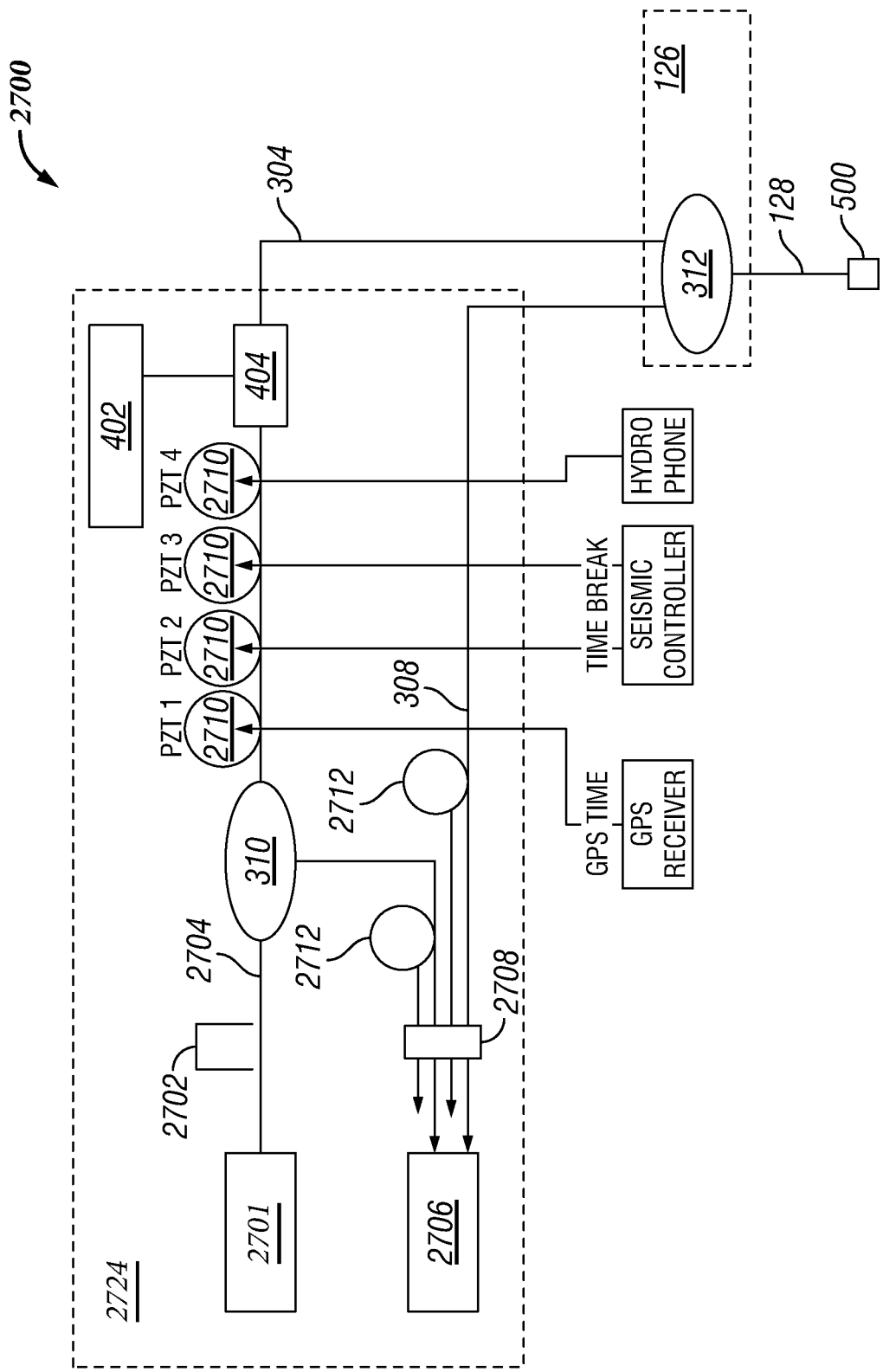
FIG. 27 illustrates an example of an interrogator in the DAS system.

FIG. 27 illustrates an example schematic view of interrogator 2724. As illustrated interrogator 2724 may be connected to umbilical line 126 and downhole fiber 128 to form DAS system 2700. As illustrated, umbilical line 126 may include any number of distal circulators 312 and downhole fiber 128 may include an optional Raman Mirror, which may also be referred to as Fiber Bragg Grating 500.

Interrogator 2724 may include one or more lasers 2701. Lasers 2701 may be multiplexing laser, which may operate by multiplexing a plurality coherent laser sources via a WDM 404. One or more lasers 2701 may emit a light pulse 2702, which may be of a modified pulse shape. Optical pulse shaping and pre-distortion methods may be employed to increase overall optical power that may be launched into a fiber string 2704, which may connect one or more lasers 2701 to proximal circulator 310. Light pulse 2702 may travel from proximal circulator 310 through first fiber optic cable 304 to WDM 404, which may be attached to a Raman Pump 402 at the opposite end, and to umbilical line 126. Light pulse 2702 may travel to distal circulator 312 in umbilical line 126 and the length of downhole fiber 128. Any residual Raman amplification may be reflected back by Fiber Bragg Grating 500 that has been constructed to reflect the particular wavelengths used by the Raman Pump and transmit all others. The backscattered light from the downhole fiber 128 may travel back to distal circulator 312 and then up second fiber optic cable 308 to a dedicated interrogator receiver arm.

In examples, the dedicated interrogator receiver arm may allow interrogator 2724 to selectively receive backscattered light from different portions along the length of a fiber optic cable, as seen in FIGS. 10 and 11. For example, interrogator receiver arm may include a dedicated amplifier 2708 that may selectively amplify the backscattered light from downhole fiber 128, a second region of the fiber optic cable, using a higher amplification factor than the dedicated amplifier 2708 used to selective amplify the backscattered light received from first fiber optic cable 304, a first region of the fiber optic cable. Gauges 2712 may have gauge lengths employed in the two dedicated interrogator receiver arms may differ (e.g., also described in FIG. 2). Finally, each dedicated interrogator receiver arm may be equipped with receivers 2706 that are optimized according to certain characteristics of the interferometric signals corresponding to the backscattered light received from the two fiber sensing regions. Note that although FIG. 27 only shows two dedicated interrogator receiver arms for each sensing fiber regions, it is not intended to be limited to such and may be extended to an arbitrary number of dedicated interrogator receiver arms, where each receiver arm receives and processes the backscattered light signal of a single sensing fiber region of downhole fiber 128.

FIG. 27 further illustrates example inputs 2710 for piezoelectric (PZT) devices. In examples, PZT devices functionally allow dynamic stretching (straining) of optical fibers, which may be embodied in coiled form around the PZT, attached thereto, resulting in optical phase modulation of light propagating along the attached optical fiber. The PZT elements are excitable via electrical signals from any electronic signal information generating source thus allowing information to be converted from electrical signals to optical phase modulated signals along the optical fiber attached thereto. Without limitation, PZT devices attached to input 2710 may be a GPS receiver, seismic controller, hydrophone, and/or the like.

Figure 28:
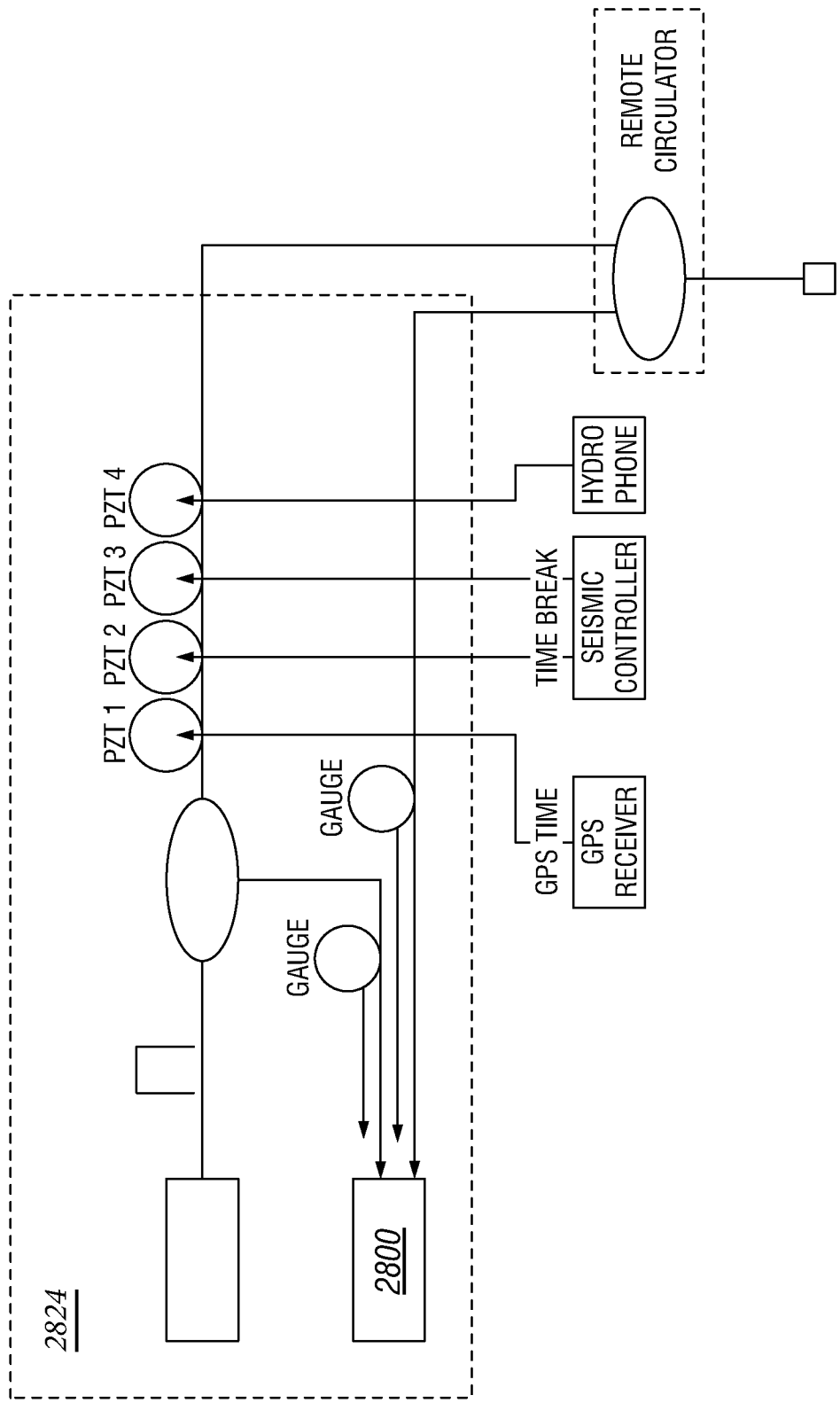
FIG. 28 illustrates a schematic of the interrogator with a single photon detector.

FIG. 28 illustrates an example of a schematic view of another example of interrogator 2824 with a single photon detector (SPD) 2800. SPD 2800 replaces receivers 2706 (e.g., referring to FIG. 27) within interrogator 2824. This allows for the removal of Raman Pump 402, dedicated amplifier 2708, and WDM 404 (e.g., referring to FIG. 27) from interrogator 2824. Utilization of SPD 2800 alters DAS system 2700 (e.g., referring to FIG. 27) by reducing the noise floor with DAS system 200 to increase SNR. The noise floor is the average energy over a spectral range generated by background processes in the detection system. For an optical device, these may include thermal noise (due to fluctuations caused by heat), pink noise (due to fluctuations caused by changing defects), burst noise (due to fluctuations caused by static defects), and shot noise (due to intrinsic fluctuations of the electromagnetic field with the detector). An SPD 2800 may eliminate (through reduction or compensation) all sources of noise except shot noise and may lead to a reduction in the noise floor by up to 100 dB, directly increasing SNR.

In examples, SPD 2800 may be used in subsea operation or land operations utilizing Rayleigh DAS, Raman Distributed Temperature Sensing (DTS), and Brillouin Distributed Strain Sensing (DSS). DTS operates and functions when a light pulse generates backscattered signals due to inelastic scattering within optical fiber. This inelastic scattering, which is strongly temperature dependent, results in a frequency shift to lower frequency (Stokes Raman Scattering) or higher frequency (Anti-Stokes Raman Scattering), both of which are temperature dependent (and usually around ~13 THz). By detecting these two shifted back-scattered signals, and appropriate math, the temperature may be determined. DSS operates and functions on a photon inelastically interacting with an acoustic phonon in an optical fiber. During the interaction, momentum is transferred with the phonon and the backscattered photon is frequency shifted (~9-11 GHz) compared to the incident light frequency. The extent of frequency shift is dependent on the strain and the temperature of the fiber.

SPD 2800 may be cyro-cooled and operate and function utilizing superconducting nanowire technology. In examples SPD 2800 does not require boosting of optical power but rather lowers the noise floor of signal detection by up to a factor of 100 dB. The detector in SPD 1700 may be designed to multiplex multiple wavelengths or polarizations into the same detector system and may have very narrow wavelength selectivity or larger optical linewidths. These allow both strong wavelength selectivity without the need of optical filters or enables detection of multiple backscatter pulse types (Raman, Brillouin, Rayleigh) on the same detector system. An SPD 2800 may include superconducting nanowire single-photon detector, Photomultiplier tubes, Avalanche photodiodes, Frequency up-conversion, Visible light photon counter, Transition edge sensor, Quantum dots, and Perovskite/Graphene phototransistors (for room temperature operation). In examples, Multiple SPDs and beam-splitters may be used, such as in a homodyne configuration comparing the sum and differences of two SPD signals after a beam path is split by the beamsplitter), to determine the extent of the contribution of shot noise of the overall signal. In examples, the quantum efficiency of SPDs may range from ~20% up to 99.99%

Figure 29:
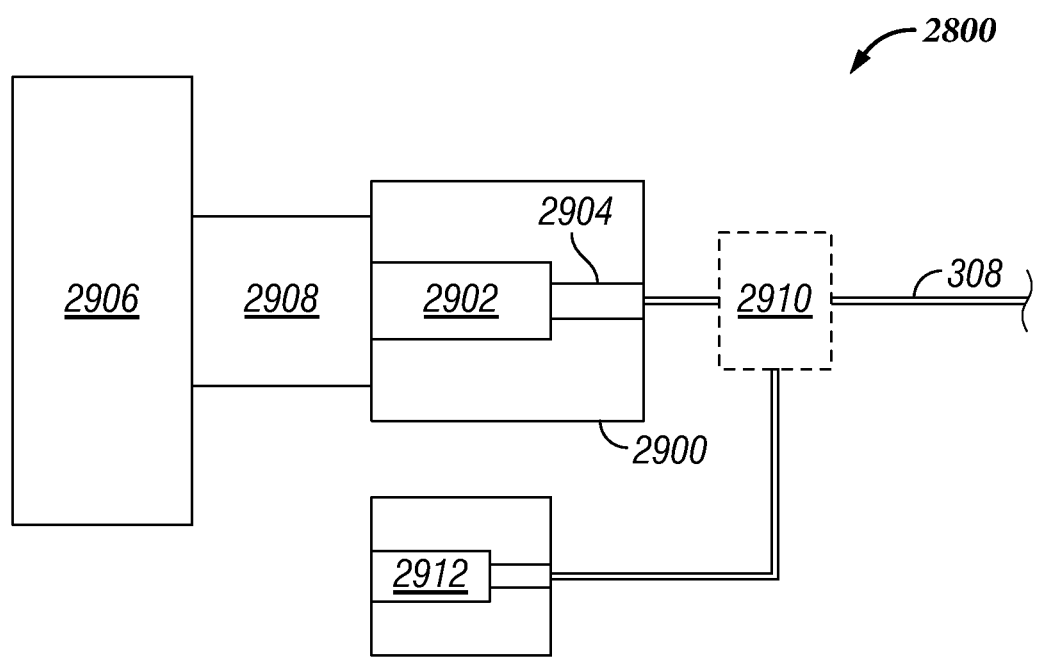
FIG. 29 illustrates an examples of a single photon detector.

FIG. 29 illustrates an example of a schematic drawing of SPD 2800. As illustrated, SPD 2800 may include a housing 2900 for enclosing the optical detector 2902 and for providing an optical shield for optical detector 2902. Housing 2900 may include an aperture 2904 for passage of the fiber optic cable, which is identified as second fiber optic cable 308. However, examples are not limited thereto, and in some examples, a coupler may be mounted so that second fiber optic cable 308 terminates at a boundary of the housing 2900.

In examples, SPD 2800 may include a cooling mechanism 2906 having the housing 2900 mounted thereto. Cooling mechanism 2906 is configured to maintain the temperature of a light-sensitive region of optical detector 2902 within a temperature range below 210 degrees Kelvin. In some examples, cooling mechanism 2906 operates using liquid helium (He) or liquid nitrogen (N2). In some examples, cooling mechanism 2906 maintains the temperature of the light-sensitive region of optical detector 2902 at a temperature at or below 80 degrees Kelvin. In some examples, cooling mechanism 2906 maintains the temperature of the light-sensitive region of the optical detector 2902 at a temperature at or below 5 degrees Kelvin (e.g., when sealed helium systems are used). In some examples, cooling mechanism 2906 may be of one or more of a variety of configurations, including Dilutio-Magnetic, Collins-Helium Liquefier, Joule-Thomson, Stirling-cycle cryocooler, self-regulated Joule-Thomson, Closed-Cycle Split-Type Stirling, Pulse Tube, a two-stage Gifford-McMahon cryogenic cooler or multi-stage Gifford-McMahon cryogenic cooler, or a cooler using magnetocaloric effect, by way of example. Lowering the temperature of optical detector 2902 improves the SNR of optical detector 2902 by decreasing dark current, by increasing sensitivity, and by reducing resistive loss by causing optical detector 2902 to enter a superconducting regime of operation. In some embodiments or configurations non-SPD optical detectors 2902 may not enter a superconducting regime, while still having little to no thermal noise.

In some examples, SPD 2800 includes a cold head 2908 between the optical detector 2902 and cooling mechanism 2906. However, some embodiments do not include cold head 2908. In examples, housing 2900 is mounted to cooling mechanism 2906 such that moisture is prevented from entering the housing. For example, housing 2900 may be mounted such that a vacuum seal is formed with the cooling mechanism 2906 or the cold head 2908. Additionally, housing 2900 may have a non-reflective inner surface.

As further illustrated in FIG. 29, SPD 2800 may further include a switching or splitting mechanism 2910 to direct optical signals to optical detector 2902, or a non-SPD optical detector 2912. Splitting mechanism 2910 may split optical signals based at least in part on wavelength of the optical signal, power of the optical signal, polarization, or any other parameter or criterion. For example, high-power optical signals may be routed to non-SPD optical detector 2912, and away from optical detector 2902 and low-powered optical signals may be routed to optical detectors 2902. This routing may be performed to prevent damage to optical detector 2902 while still taking full advantage of LLD and ELLD capabilities of optical detector 2902. Without limitation, high-power optical signals may cause saturation in optical detector 2902, leading to damage to optical detector 2902 or to inaccurate results. In some examples, saturation of optical detector 2902 may occur with optical signal inputs having a power of about 100 microwatts, and damage may occur at about 10 milliwatts. The noise floor that may be detected by optical detector 2902 may be at a level slightly below saturation level but is typically at least 20-30 dB. The saturation level and noise floors for non-SPD optical detectors 2912 may be different from the saturation level and noise floors for optical detector 2902. The saturation levels and noise floors also may or may not overlap, and thus multiple types of detectors may be used that may cover the full power range for system measurements. For at least these reasons, to measure a larger range of possible optical signals, optical detector 2902 are used in a system with non-SPD optical detectors 2912. Splitting mechanisms 2910 may direct or reroute optical signals based on power level or other criteria, to take advantage of the different power ranges measurable by optical detector 2902 versus non-SPD optical detectors 2912.

In addition to or instead of a splitting mechanism 2910, SPD 2800 may include a coupling mechanism or other mechanism to split the light with optical couplers (with or without feedback). These mechanisms may be multi-stage (e.g., the light may be split in one stage, then split again in a second stage), and may split light based on power, wavelength, or phase. Processor or computation-based systems may also be used in some embodiments to dynamically direct or reroute light signals among any available optical path as power increases or based on any other criteria.

In examples, SPD 2800 may be connected to information handling system 130 (e.g., referring to FIG. 1) through interrogator 2824 to obtain measurement data. In some examples, some portions of the interrogator 2824 may be positioned at a surface of the Earth, while some portions to interrogator 2824 may be placed downhole. When more than one optical detector 1802 is used, for example, some of the optical detectors 2902 or 2912 may be placed downhole, and some may be placed at the surface. In some examples, one or more cooling mechanisms 2906 may be placed downhole proximate one or more optical detectors 2902 although power and geometry considerations should be considered with such configurations to provide power for cooling in an appropriately sized borehole.

In production and/or measurement operations, the use of SPD 2800 may be safer than using a Raman Pump 402 (e.g., referring to FIG. 27). Raman Pump 402 may increase the power moving through DAS system 200, which may lead to explosions and damage from high power increased by Raman Pump 402. Using SPD 2800 removes Raman Pump 402 and protects against explosions from hazardous gas used with Raman Pump 402, increases eye safety by prevent high energy light pulses from contacting the human eye, and may further prevent connector damage and failure from high power densities. Additionally, as lower optical pulse powers are used, non-linear distortion of the optical pulse shape is negligible, allowing for minimal to no pulse forming.

Utilizing SPD 2800 may improve current technology by allowing greater lengths of fiber with greatly attenuated signals, high transmission loss interconnects (such as used offshore) may be used, even though the attenuation is high. An SPD 2800 may have selective frequency, reducing background noise contribution of other optical sources or devices (such as from a Raman pump or scatter from a grating), and distortion of the optical pulse shape is negligible. Additionally, an SPD 2800 may be gated extremely fast, detect very few photons, and the spatial resolution can be extremely high.

Figure 30:
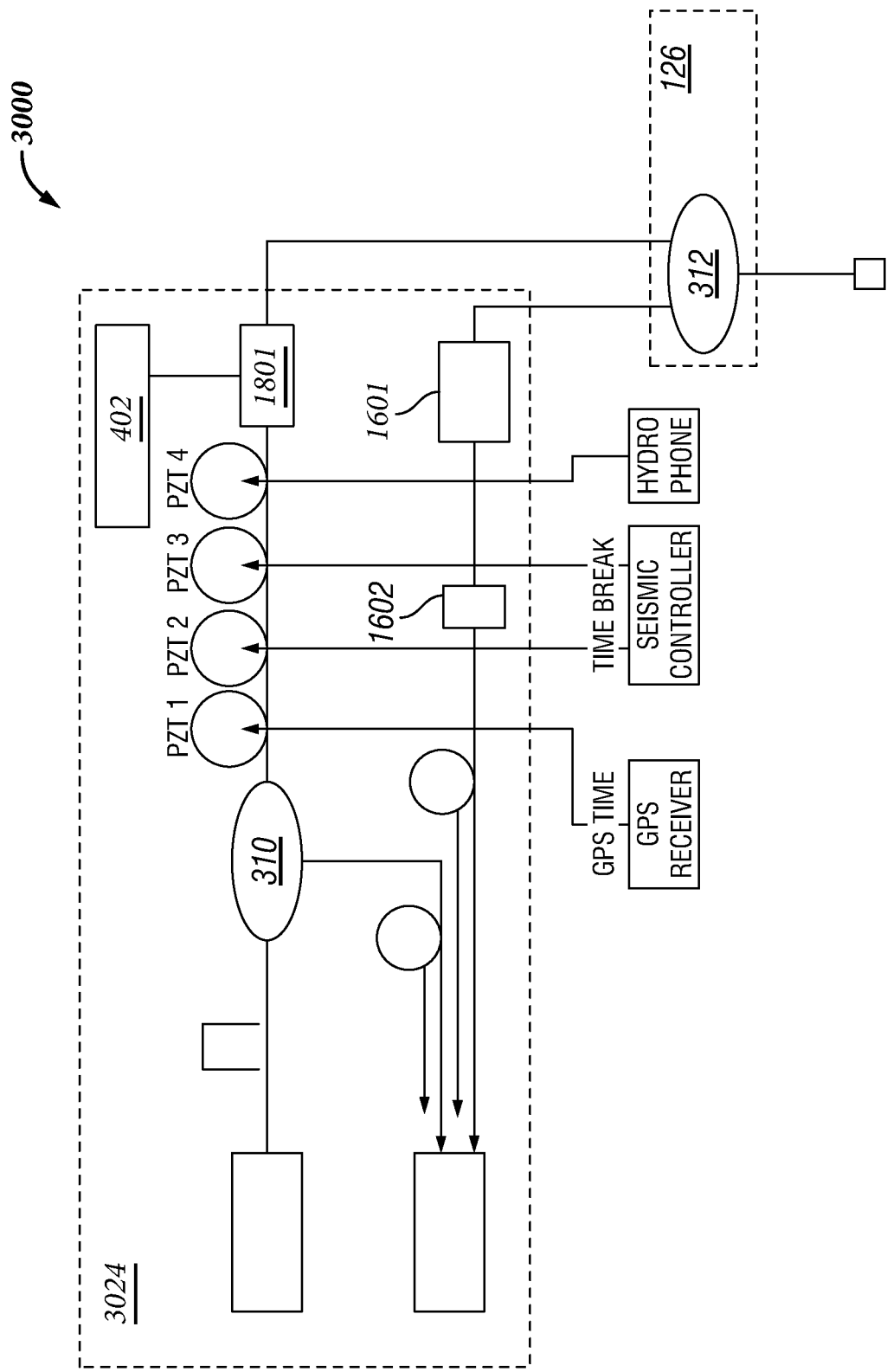
FIG. 30 illustrates another example of the interrogator.

FIG. 30 illustrates another example DAS system 3000 having an interrogator 3024 with optical shutter 1601 and EDFA 1602 are disposed between proximal circulator 310 and distal circulator 312 on second fiber optic cable 308, as described in FIG. 16 above. In addition, as described in FIG. 16, Raman Pump 402 may be attached to WDM 1801 which is disposed on first fiber optic cable 304. Raman Pump 402 and WDM 1801. In this example, distal circulator 312 is disposed in umbilical line 126. In this example, interrogator 3024 may be configured to combine the optical pump laser for remote amplification and signal laser from the interrogator onto one common fiber.

The systems and methods for using a distributed acoustic system in a subsea environment may include any of the various features of the systems and methods disclosed herein, including one or more of the following statements. Additionally, the systems and methods for a DAS system within a subsea environment may include any of the various features of the systems and methods disclosed herein, including one or more of the following statements.

Statement 1. A distributed acoustic system (DAS) may comprise an interrogator and an umbilical line attached at one end to the interrogator, a downhole fiber attached to the umbilical line at the end opposite the interrogator. The interrogator may further include a proximal circulator, a distal circulator connected to the proximal circulator by a first fiber optic cable, and a second fiber optic cable connecting the proximal circulator and the distal circulator.

Statement 2. The DAS of statement 1, further comprising an erbium doped fiber amplifier (EDFA) disposed between the proximal circulator and the distal circulator on the second fiber optic cable.

Statement 3. The DAS of statement 2, further comprising an optical shutter disposed between the EDFA and the distal circulator on the second fiber optic cable.

Statement 4. The DAS of statement 3, further comprising a wavelength division multiplexer (WDM) pump disposed on the first fiber optic cable between the proximal circulator and the distal circulator.

Statement 5. The DAS of statement 4, further comprising a Raman Pump connected to the WDM pump.

Statement 6. The DAS of statement 2, further comprising an optical shutter disposed between the distal circulator and the umbilical line.

Statement 7. The DAS of statements 1 or 2, wherein the first fiber optic cable and the second fiber optic cable are different lengths.

Statement 8. The DAS of statements 1, 2, or 7, further comprising at least one Fiber Bragg Grating attached to the proximal circulator or the distal circulator.

Statement 9. The DAS of statements 1, 2, 7, or 8, wherein the interrogator is configured to receive backscattered light from a first sensing region and a second sensing region.

Statement 10. The DAS of statements 1, 2, or 7-9, wherein the DAS is disposed in a subsea system operation of one or more wells and the umbilical line attaches to the downhole fiber at a fiber connection.

Statement 11. A distributed acoustic system (DAS) may comprise an interrogator, an umbilical line attached to the interrogator at one end, and a downhole fiber attached to the umbilical line at the end opposite the interrogator.

Statement 12. The DAS of statement 11, further comprising an optical amplifier disposed in the umbilical line that is connected to a Raman Pump by a pump laser fiber.

Statement 13. The DAS of statements 11 or 12, further comprising two optical amplifiers disposed in series in the umbilical line that are each connected to individual Raman Pumps by individual pump laser fibers.

Statement 14. The DAS of statement 13, wherein the two optical amplifiers are connected to a Raman Pump by a pump laser fiber.

Statement 15. The DAS of statements 11-14, further comprising a proximal circulator, a distal circulator connected to the proximal circulator by a first fiber optic cable, a second fiber optic cable connecting the proximal circulator and the distal circulator, and wherein the proximal circulator, the distal circulator, the first fiber optic cable, and the second fiber optic cable are disposed in the umbilical line.

Statement 16. The DAS of statement 15, further comprising a first optical amplifier disposed on the first fiber optic cable between the proximal circulator and the distal circulator.

Statement 17. The DAS of statement 16, further comprising a second optical amplifier disposed on the second fiber optic cable between the proximal circulator and the distal circulator.

Statement 18. The DAS of statement 17, wherein the first optical amplifier is connected to a first Raman Pump by a first pump laser fiber and the second optical amplifier is connected to a second Raman Pump by a second pump laser fiber.

Statement 19. The DAS of statement 17, wherein the first optical amplifier and the second optical amplifier is connected to a Raman Pump by a pump laser fiber.

Statement 20. The DAS of statement 15, further comprising an optical amplifier disposed on the second fiber optic cable between the proximal circulator and the distal circulator.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or" consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A distributed acoustic system (DAS) comprising:
an interrogator comprising:
a proximal circulator;
a distal circulator connected to the proximal circulator by a first fiber optic cable; and
a second fiber optic cable connecting the proximal circulator and the distal circulator;
an umbilical line attached at one end to the interrogator;
a downhole fiber attached to the umbilical line at the end opposite the interrogator; and
an optical shutter disposed after the proximal circulator and before the downhole fiber.

2. The DAS of claim 1, further comprising an erbium doped fiber amplifier (EDFA) disposed between the proximal circulator and the distal circulator on the second fiber optic cable.

3. The DAS of claim 2, wherein the optical shutter is also disposed between the EDFA and the distal circulator on the second fiber optic cable.

4. The DAS of claim 3, further comprising a wavelength division multiplexer (WDM) pump disposed on the first fiber optic cable between the proximal circulator and the distal circulator.

5. The DAS of claim 4, further comprising a Pump connected to the WDM pump.

6. The DAS of claim 2, wherein the optical shutter is also disposed between the distal circulator and the umbilical line.

7. The DAS of claim 1, wherein the first fiber optic cable and the second fiber optic cable are different lengths.

8. The DAS of claim 1, further comprising at least one Fiber Bragg Grating attached to the proximal circulator or the distal circulator.

9. The DAS of claim 1, wherein the interrogator is configured to receive backscattered light from a first sensing region and a second sensing region.

10. The DAS of claim 1, wherein the DAS is disposed in a subsea system operation of one or more wells and the umbilical line attaches to the downhole fiber at a fiber connection.

11. A distributed acoustic system (DAS) comprising:
an interrogator;
an umbilical line attached to the interrogator at one end, wherein the umbilical line comprises:
a proximal circulator;
a distal circulator connected to the proximal circulator by a first fiber optic cable; and
a second fiber optic cable connecting the proximal circulator and the distal circulator;
a downhole fiber attached to the umbilical line at the end opposite the interrogator; and
an optical shutter disposed after the proximal circulator and before the downhole fiber.

12. The DAS of claim 11, further comprising an optical amplifier disposed in the umbilical line that is connected to a Raman Pump by a pump laser fiber.

13. The DAS of claim 11, further comprising two optical amplifiers disposed in series in the umbilical line that are each connected to individual Raman Pumps by individual pump laser fibers.

14. The DAS of claim 13, wherein the two optical amplifiers are connected to a Raman Pump by a pump laser fiber.

15. The DAS of claim 11, further comprising an erbium doped fiber amplifier (EDFA) disposed between the proximal circulator and the distal circulator on the second fiber optic cable.

16. The DAS of claim 11, further comprising a first optical amplifier disposed on the first fiber optic cable between the proximal circulator and the distal circulator.

17. The DAS of claim 16, further comprising a second optical amplifier disposed on the second fiber optic cable between the proximal circulator and the distal circulator.

18. The DAS of claim 17, wherein the first optical amplifier is connected to a first Raman Pump by a first pump laser fiber and the second optical amplifier is connected to a second Raman Pump by a second pump laser fiber.

19. The DAS of claim 17, wherein the first optical amplifier and the second optical amplifier is connected to a Raman Pump by a pump laser fiber.

20. The DAS of claim 11, further comprising an optical amplifier disposed on the second fiber optic cable between the proximal circulator and the distal circulator.

* * * * *

UNITED STATES PATENT AND TRADEMARK OFFICE
CERTIFICATE OF CORRECTION

PATENT NO. : 11,326,936 B2
APPLICATION NO. : 16/806930
DATED : May 10, 2022
INVENTOR(S) : Andreas Ellmauthaler, Glenn Andrew Wilson and John L. Maida Page 1 of 1

It is certified that error appears in the above-identified patent and that said Letters Patent is hereby corrected as shown below:

In the Claims

Claim 5, Line 1, please remove "pump" and replace with "Raman Pump".

Signed and Sealed this
Twenty-eighth Day of June, 2022

Katherine Kelly Vidal
*Director of the United States Patent and Trademark Office*